United States Patent
Sung et al.

(10) Patent No.: US 9,756,332 B2
(45) Date of Patent: Sep. 5, 2017

(54) METHOD AND AN APPARATUS FOR ENCODING/DECODING AN IMAGE

(71) Applicant: LG Electronics Inc., Seoul (KR)

(72) Inventors: Jaewon Sung, Seoul (KR); Sehoon Yea, Seoul (KR); Eunyong Son, Seoul (KR); Jiwook Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 14/346,389

(22) PCT Filed: Sep. 18, 2012

(86) PCT No.: PCT/KR2012/007442
§ 371 (c)(1),
(2) Date: Mar. 21, 2014

(87) PCT Pub. No.: WO2013/042912
PCT Pub. Date: Mar. 28, 2013

(65) Prior Publication Data
US 2014/0205011 A1      Jul. 24, 2014

Related U.S. Application Data

(60) Provisional application No. 61/537,541, filed on Sep. 21, 2011.

(51) Int. Cl.
*H04N 7/12*       (2006.01)
*H04N 11/02*      (2006.01)
(Continued)

(52) U.S. Cl.
CPC ....... *H04N 19/00569* (2013.01); *H04N 19/50* (2014.11); *H04N 19/593* (2014.11); *H04N 19/597* (2014.11)

(58) Field of Classification Search
CPC ........... H04N 19/597; H04N 19/00569; H04N 19/593; H04N 19/50
(Continued)

(56) References Cited

U.S. PATENT DOCUMENTS 8,619,857 B2 * 12/2013 Zhao ...................... H04N 19/50
                                                    375/240.12
2009/0110070 A1 * 4/2009 Takahashi ............ H04N 19/176
                                                    375/240.12
(Continued)

FOREIGN PATENT DOCUMENTS

| CN | 100373791 | 3/2008 |
| CN | 101969569 | 2/2011 |

(Continued)

OTHER PUBLICATIONS

International Search Report dated Feb. 18, 2013 for Application No. PCT/KR2012/007442, with English Translation, 4 pages.

(Continued)

*Primary Examiner* — Jorge L Ortiz Criado
*Assistant Examiner* — Boubacar Abdou Tchoussou
(74) *Attorney, Agent, or Firm* — Fish & Richardson P.C.

(57) ABSTRACT

The present invention discloses an intra prediction method for predicting pixel values within a prediction target block on the basis of a plurality of peripheral pixels adjacent to the prediction target block. The intra prediction method according to the present invention includes the steps of: receiving and decoding encoded image information; determining a target boundary by determining a plurality of boundary pixels representing the target boundary within the prediction target block on the basis of the decoded image information; determining a plurality of prediction target regions partitioned on the basis of the target boundary within the prediction target block; and performing a prediction for each of (Continued)

the plurality of prediction target regions on the basis of peripheral pixels differing from each other selected from among the plurality of the peripheral pixels.

19 Claims, 20 Drawing Sheets

(51) Int. Cl.
  *H04N 11/04* (2006.01)
  *H04N 19/50* (2014.01)
  *H04N 19/597* (2014.01)
  *H04N 19/593* (2014.01)

(58) Field of Classification Search
  USPC .................................................. 375/240.12
  See application file for complete search history.

(56) References Cited

U.S. PATENT DOCUMENTS

| | | |
|---|---|---|
| 2009/0225834 A1 | 9/2009 | Song |
| 2010/0034268 A1 | 2/2010 | Kusakabe |
| 2010/0322309 A1* | 12/2010 | Huang ................. H04N 19/895 375/240.12 |
| 2011/0135000 A1 | 6/2011 | Alshina |
| 2011/0142132 A1* | 6/2011 | Tourapis .......... H04N 19/00721 375/240.16 |
| 2011/0274166 A1 | 11/2011 | Jeon |
| 2012/0008683 A1* | 1/2012 | Karczewicz ......... H04N 19/159 375/240.12 |

FOREIGN PATENT DOCUMENTS

| | | |
|---|---|---|
| EP | 2 384 004 A4 | 8/2012 |
| JP | H11-220735 | 8/1999 |
| KR | 10-2009-0095316 A | 9/2009 |
| KR | 10-2011-0065090 A | 6/2011 |
| WO | WO 2009/037828 A1 | 3/2009 |
| WO | WO 2010/087589 A2 | 8/2010 |

OTHER PUBLICATIONS

Search Report dated Apr. 30, 2015 for corresponding European Patent Application No. 12833227.7, 9 pages.
Zou et al., "Edge-based Adaptive Directional Intra Prediction (EADIP)", ITU—Telecommunications Standardization Sector, Study Group 16, Question 6, Video Coding Experts Group (VCEG), 39th Meeting Kyoto, Japan, Jan. 17-22, 2010, 6 pages.
Sung et al., "Description of 3D Video Coding Technology Proposal by LG Electronics", International Organisation for Standardisation Organisation Internationale de Normalisation ISO/IEC JTC1/SC29/ 2G11, Coding of Moving Pictures and Audio, ISO/IEC JCT1/SC29/ 2G11 MPEG2011/J22577, Geneva, Switzerland, Nov. 2011, 22 pages.

* cited by examiner

FIG. 14
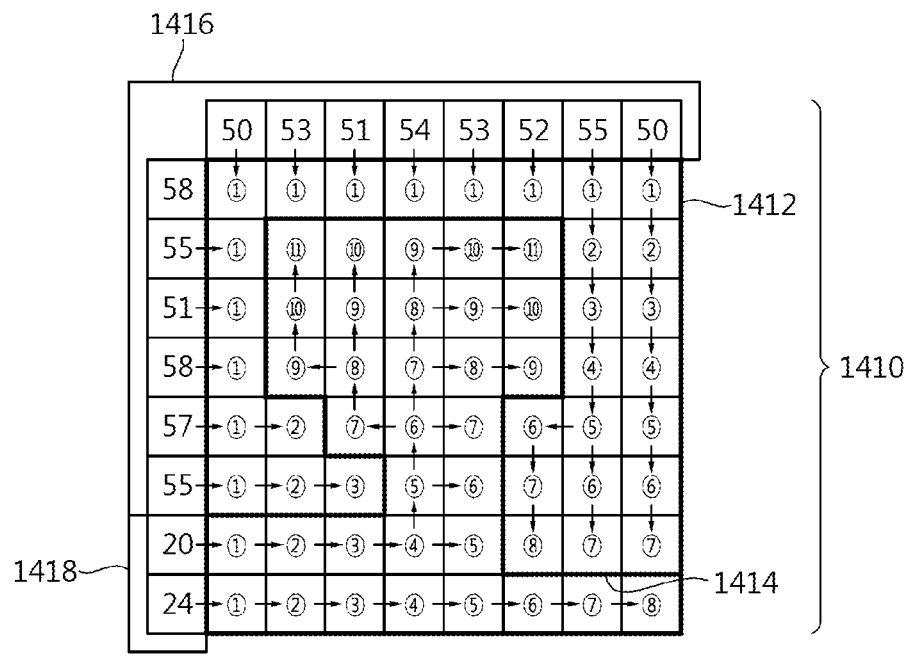
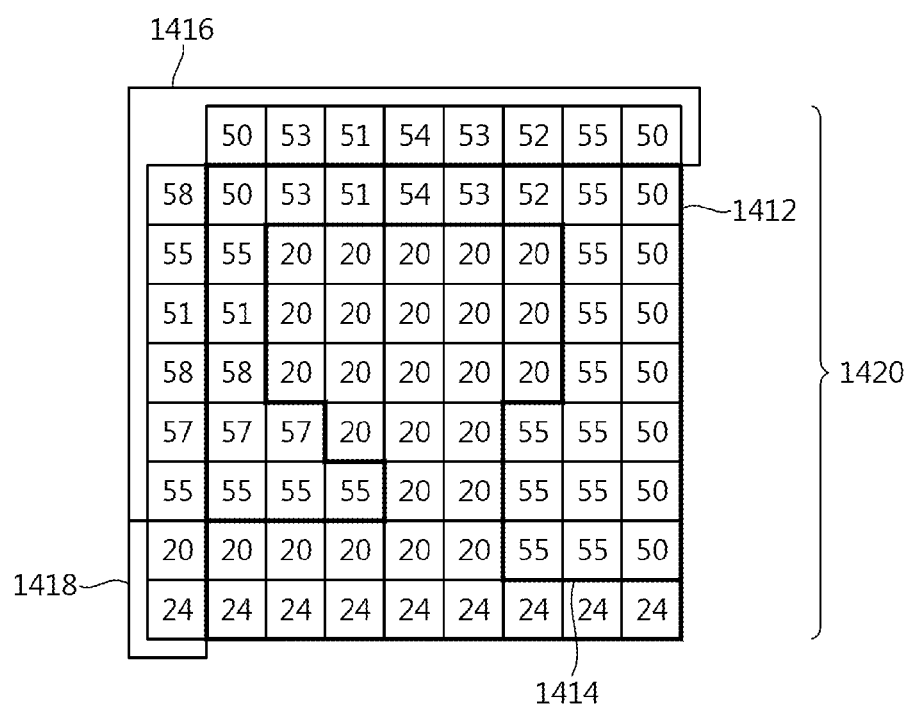

US 9,756,332 B2

METHOD AND AN APPARATUS FOR ENCODING/DECODING AN IMAGE

CROSS REFERENCE TO RELATED APPLICATIONS

This application is a U.S. National Phase Application under 35 U.S.C. §371 of International Application PCT/KR2012/007442, filed on Sep. 18, 2012, which claims the benefit of U.S. Provisional Application No. 61/537,541, filed on Sep. 21, 2011, the entire content of the prior applications is incorporated by reference in its entirety.

TECHNICAL FIELD

The present invention relates to video processing, and more particularly, to method and device for intra-predicting a depth image.

BACKGROUND ART

Digital broadcast services using a 3D video have attracted attention as a next-generation broadcast service. A 3D video can provided a sense of realism and a sense of immersion using plural viewpoint channels. Examples of the 3D video providing a three-dimensional effect include a binocular 3D video, a multi-view 3D video, and a hologram.

In a 3D video, a depth image as well as a texture image can be encoded and/or decoded, unlike existing 2D videos. Unlike a texture image which is a video compression standard target in the related art, a depth image may include depth information of objects in a screen. The three-dimensional effect of a 3D video can be expressed by the depth information.

SUMMARY OF THE INVENTION

Technical Problem

An object of the present invention is to provide video encoding method and device which can enhance encoding/decoding efficiency of a video.

Another object of the present invention is to provide video decoding method and device which can enhance encoding/decoding efficiency of a video.

Still another object of the present invention is to provide intra prediction method and device which can enhance encoding/decoding efficiency of a video.

Still another object of the present invention is to provide video information transmitting method and device which can enhance encoding/decoding efficiency of a video.

Solution to Problem

According to an aspect of the present invention, there is provided an intra prediction method of predicting pixel values in a prediction target block on the basis of plural neighboring pixels adjacent to the prediction target block. The intra prediction method includes: receiving and decoding encoded video information; determining a target boundary by determining a plurality of boundary pixels indicating the target boundary in the prediction target block on the basis of the decoded video information; determining a plurality of prediction target regions into which the prediction target block is split by the target boundary; and performing a prediction process on the plurality of prediction target regions on the basis of different neighboring pixels out of the plurality of neighboring pixels.

The prediction target block may be one block of a plurality of blocks constituting a depth image of a 3D video.

The plurality of boundary pixels may include N boundary pixels $\{p_0, p_1, \ldots p_n, \ldots p_{N-1}\}$, N may be a positive integer, n may be an integer of 0 to N−1, and the boundary pixel $p_n$ may be sequentially determined along a progress direction from the boundary pixel $p_{n-1}$.

The received video information may include position information indicating a position of a start boundary pixel $p_0$ which is first determined out of the plurality of boundary pixels, and the step of determining the target boundary may include determining the start boundary pixel $p_0$ on the basis of the position information.

The start boundary pixel $p_0$ may be a pixel located at the leftmost position or the uppermost position in the prediction target block.

The video information may include information on a chain code corresponding to the boundary pixel $p_n$, the chain code may indicate an angle between a first progress direction from the boundary pixel $p_{n-1}$ to the boundary pixel $p_n$ and a second progress direction from the boundary pixel $p_n$ to the boundary pixel $p_{n+1}$, and the step of determining the target boundary may include determining a partial boundary corresponding to a part adjacent to the boundary pixel $p_n$ in the target boundary on the basis of the first progress direction and the second progress direction.

The angle may be one of 0 degrees, 45 degrees, −45 degrees, 90 degrees, −90 degrees, 135 degrees, and −135 degrees.

The step of determining the target boundary may include determining the position of the boundary pixel $p_{n+1}$ on the basis of the first progress direction and the second progress direction.

The boundary pixel $p_n$ may correspond to the start boundary pixel $p_0$. In this case, the first progress direction may be set to a right horizontal direction when the boundary pixel $p_n$ is a pixel located at the leftmost position in the prediction target block, and the first progress direction may be set to a lower vertical direction when the boundary pixel $p_n$ is a pixel located at the uppermost position in the prediction target block.

The boundary pixel $p_{N-1}$ may be an end boundary pixel which is finally determined out of the plurality of boundary pixels, and the step of determining the target boundary may include determining a partial boundary corresponding to a part adjacent to the end boundary pixel $p_{N-1}$ in the target boundary on the basis of the progress direction from the boundary pixel $p_{N-2}$ to the end boundary pixel $p_{N-1}$.

The plurality of prediction target regions may include M prediction target regions $R_0, R_1, \ldots, R_m, \ldots,$ and $R_{M-1}$, M is a positive integer, and m is an integer of 0 to M−1, and the step of performing the prediction process may include performing a prediction process on the prediction target region $R_m$ on the basis of the neighboring pixels adjacent to the prediction target region $R_m$ out of the plurality of neighboring pixels.

The step of performing the prediction process may include determining an average pixel value of the neighboring pixels adjacent to the prediction target region $R_m$ as predicted values of the pixels belonging to the prediction target region $R_m$.

According to another aspect of the present invention, there is provided a video decoder. The video decoder includes: a receiver module that receives video information; a prediction module that constructs a predicted block corresponding to a prediction target block by predicting pixel values in the prediction target block on the basis of a plurality of neighboring pixels adjacent to the prediction target block; and a reconstructed block constructing module that constructs a reconstructed block on the basis of the predicted block, wherein the prediction module determines a target boundary by determining a plurality of boundary pixels indicating the target boundary in the prediction target block on the basis of the decoded video information, and performs a prediction process on a plurality of prediction target regions, into which the prediction target block is split by the target boundary, on the basis of different neighboring pixels out of the plurality of neighboring pixels.

According to still another aspect of the present invention, there is provided a video decoding method. The video decoding method includes the steps of: receiving and decoding encoded video information; determining a target boundary by determining a plurality of boundary pixels indicating the target boundary in the prediction target block on the basis of the decoded video information; determining a plurality of prediction target regions into which the prediction target block is split by the target boundary; constructing a predicted block corresponding to the prediction target block by performing a prediction process on the plurality of prediction target regions on the basis of different neighboring pixels out of the plurality of neighboring pixels adjacent to the prediction target block; and constructing a reconstructed block on the basis of the predicted block.

The prediction target block may be one block of a plurality of blocks constituting a depth image of a 3D video.

The plurality of boundary pixels may include N boundary pixels $\{p_0, p_1, \ldots, p_n, \ldots, p_{N-1}\}$, N may be a positive integer, n may be an integer of 0 to N−1, and the boundary pixel $p_n$ may be sequentially determined along a progress direction from the boundary pixel $p_{n-1}$.

The received video information may include position information indicating a position of a start boundary pixel $p_0$ which is first determined out of the plurality of boundary pixels, and the step of determining the target boundary may include determining the start boundary pixel $p_0$ on the basis of the position information.

The video information may include information on a chain code corresponding to the boundary pixel $p_n$, the chain code may indicate an angle between a first progress direction from the boundary pixel $p_{n-1}$ to the boundary pixel $p_n$ and a second progress direction from the boundary pixel $p_n$ to the boundary pixel $p_{n+1}$, and the step of determining the target boundary may include determining a partial boundary corresponding to a part adjacent to the boundary pixel $p_n$ in the target boundary on the basis of the first progress direction and the second progress direction.

The plurality of prediction target regions may include M prediction target regions $R_0, R_1, \ldots, R_m, \ldots,$ and $R_{M-1}$, M may be a positive integer, m may be an integer of 0 to M−1, and the step of constructing the predicted block may include performing a prediction process on the prediction target region $R_m$ on the basis of the neighboring pixels adjacent to the prediction target region $R_m$ out of the plurality of neighboring pixels.

The step of constructing the predicted block may include determining an average pixel value of the neighboring pixels adjacent to the prediction target region $R_m$ as predicted values of the pixels belonging to the prediction target region $R_m$.

Advantageous Effects

By employing the video encoding method according to the present invention, it is possible to enhance encoding/decoding efficiency of a video.

By employing the video decoding method according to the present invention, it is possible to enhance encoding/decoding efficiency of a video.

By employing the intra prediction method according to the present invention, it is possible to enhance encoding/decoding efficiency of a video.

By employing the video information transmitting method according to the present invention, it is possible to enhance encoding/decoding efficiency of a video.

BRIEF DESCRIPTION OF THE DRAWINGS

FIG. 14 is a diagram schematically illustrating an example of a method of performing an intra prediction process on regions in a prediction target block.

DESCRIPTION OF EMBODIMENTS

Figure 1:
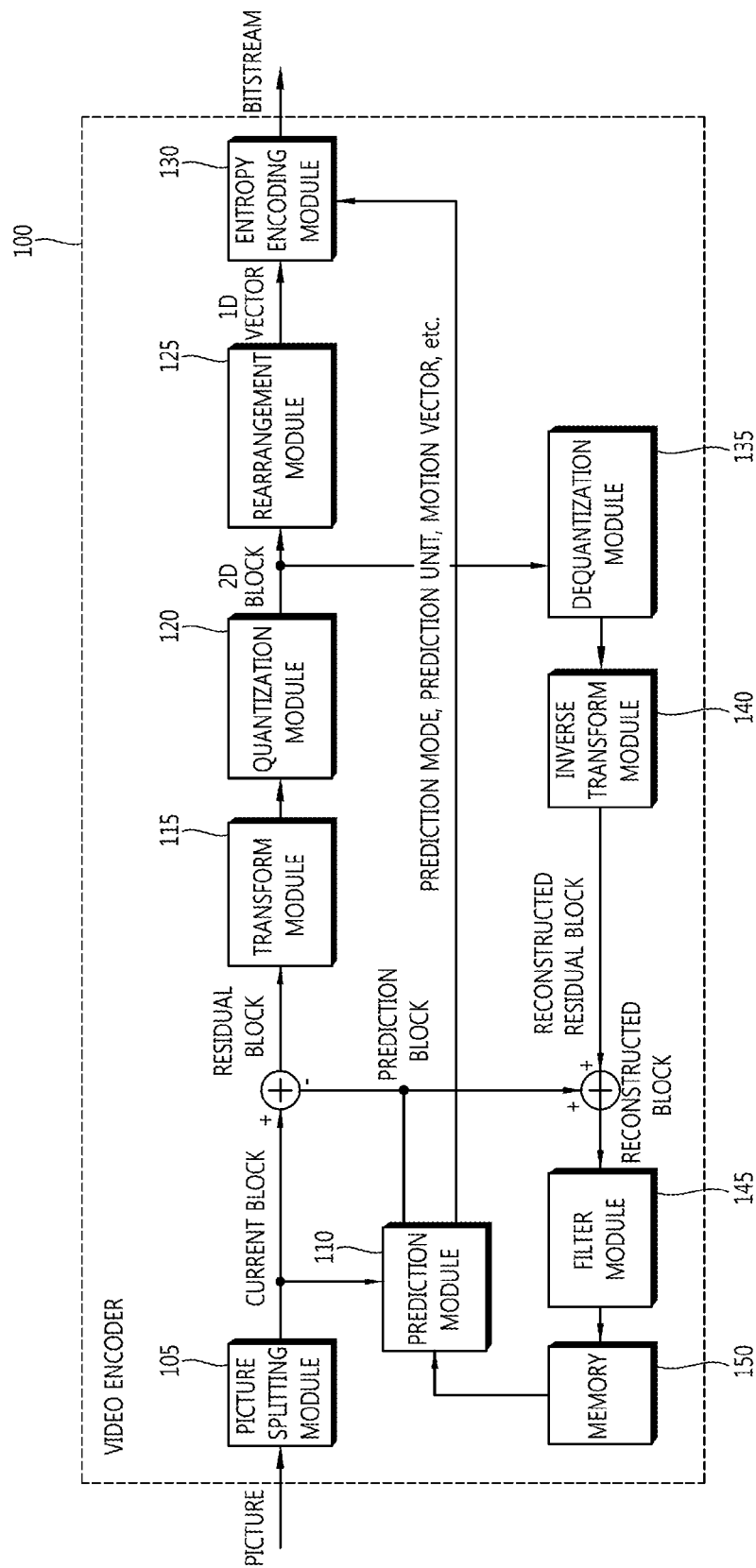
FIG. 1 is a block diagram schematically illustrating a video encoder according to an embodiment of the present invention.

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions in an image encoder and an image decoder, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

Some elements may not be essential elements for performing essential functions of the invention but may be selective elements for merely improving performance. The invention may be embodied by only the elements essential to embody the invention, other than the elements used to merely improve performance, and a structure including only the essential elements other than the selective elements used to merely improve performance belongs to the scope of the invention.

Hereinafter, exemplary embodiments of the invention will be described in detail with reference to the accompanying drawings. The same elements in the drawings will be referenced by the same reference signs and the description of the same elements will not be repeated.

FIG. 1 is a block diagram schematically illustrating a video encoder according to an embodiment of the present invention.

In a 3D video, a depth image as well as a texture image can be encoded and/or decoded, unlike existing 2D videos. Unlike a texture image which is a video compression standard target in the related art, a depth image may include depth information of objects in a screen. The three-dimensional effect of a 3D video can be expressed by the depth information. The video encoder illustrated in FIG. 1 can be applied to a texture image and a depth image.

Referring to FIG. 1, a video encoder 100 includes a picture splitting module 105, a prediction module 110, a transform module 115, a quantization module 120, a rearrangement module 125, an entropy encoding module 130, a dequantization module 135, an inverse transform module 140, a filter module 145, and a memory 150.

The picture splitting module 105 may split an input picture into at least one process unit. The input picture may be a texture picture of a texture image or a depth picture of a depth image. Here, the process unit may be a prediction unit (PU), a transform unit (TU), or a coding unit (CU). Embodiments will be described below based on process units which are created by splitting an encoding/decoding target picture (or a current picture) and units may be referred to as blocks in some cases. In the below description, a block acquired by splitting a texture picture is referred to as a texture block and a block acquired by splitting a depth picture is referred to as a depth block.

The prediction module 110 may include an inter prediction module that performs an inter prediction process and an intra prediction module that performs an intra prediction process, as will be described later. The prediction module 110 may perform a prediction process on the prediction unit supplied from the picture splitting module 105 to construct a predicted block. The process unit of a picture in the prediction module 110 may be a coding unit, a transform unit, or a prediction unit. It may be determined whether the prediction process performed on the process unit is inter prediction or intra prediction and specific details (for example, a prediction mode) of the determined prediction method may be determined. Here, the process unit on which the prediction process is performed may be different from the process unit of which the specific details are determined. For example, the prediction method and the prediction mode may be determined by prediction units, and the prediction process may be performed by transform units. A residual value (residual block) between the constructed predicted block and the original block may be input to the transform module 115. Prediction mode information, motion vector information, and the like used for the prediction along with residual value may be encoded and transmitted to a decoder by the entropy encoding module 130.

The transform module 115 may transform the residual block by units of transform and may construct transform coefficients. The unit of transform in the transform module 115 may be a transform unit and may have a quad tree structure. At this time, the size of the transform unit may be determined within a range including a predetermined largest size and a predetermined minimum size. The transform module 115 may transform the residual block using a DCT (Discrete Cosine Transform) and/or a DST (Discrete Sine Transform).

The quantization module 120 may quantize the residual values transformed by the transform module 115 and may create quantization coefficients. The values calculated by the quantization module 120 may be supplied to the dequantization module 135 and the rearrangement module 125.

The rearrangement module 125 may rearrange the quantization coefficients supplied from the quantization module 120. By rearranging the quantization coefficients, it is possible to enhance the coding efficiency in the entropy encoding module 130. The rearrangement module 125 may rearrange the quantization coefficients in the form of a two-dimensional block to the form of a one-dimensional vector through the use of a coefficient scanning method. The rearrangement module 125 may enhance the entropy encoding efficiency in the entropy encoding module 130 by changing the order of coefficient scanning on the basis of stochastic statistics of the coefficients transmitted from the quantization module.

The entropy encoding module 130 may perform an entropy encoding process on the quantization coefficients rearranged by the rearrangement module 125. The entropy encoding module 130 may encode a variety of information such as quantization coefficient information of a coding unit, block type information, prediction mode information, split unit information, prediction unit information, transfer unit information, motion vector information, reference picture information, block interpolation information, and filtering information which are transmitted from the rearrangement module 125 and the prediction module 110.

Entropy encoding methods such as an exponential golomb method, a CAVLC (Context-Adaptive Variable Length Coding) method, and/or a CABAC (Context-Adaptive Binary Arithmetic Coding) method may be used for the entropy encoding. For example, a table used to perform the entropy encoding process such as a variable length coding (hereinafter, referred to as "VLC") table may be stored in the entropy encoding module 130. The entropy encoding module 130 may perform the entropy encoding process using the stored VLC table. For example, in the CABAC entropy encoding method, the entropy encoding module 130 may binarize a symbol, convert the binarized symbol into bins, and then perform an arithmetic encoding process on the bins depending on occurrence probabilities of the bins to create a bitstream.

When the entropy encoding is used, a low index and a short codeword corresponding thereto may be allocated to a symbol of a high occurrence probability, and a high index and a long codeword corresponding thereto may be allocated to a symbol of a low occurrence probability. Therefore, it is possible to reduce the bit rate of the symbols to be encoded and to improve video compression performance by the entropy encoding.

The dequantization module 135 dequantizes the values quantized by the quantization module 120. The inverse transform module 140 inversely transforms the values dequantized by the dequantization module 135. The residual value created by the dequantization module 135 and the inverse transform module 140 may be merged with the predicted block predicted by the prediction module 110 to construct a reconstructed block.

The filter module 145 may apply an in-loop filter to the reconstructed block and/or picture. The in-loop filter may include a deblocking filter, a sample adaptive offset (SAO), and/or an adaptive loop filter (ALF).

The deblocking filter may remove a block distortion generated at the boundary between blocks in the reconstructed picture. The SAO may an appropriate offset value to pixel values so as to compensate for a coding error. The ALF may perform a filtering process on the basis of the resultant values of comparison of the original picture with the reconstructed picture of which the blocks have been filtered by the deblocking filter.

On the other hand, the filter module 145 may not perform a filtering process on the reconstructed block used for the intra prediction.

The memory 150 may store the reconstructed block or picture calculated by the filter module 145. The reconstructed block or picture stored in the memory 150 may be supplied to the prediction module 110 that performs the inter prediction.

Figure 2:
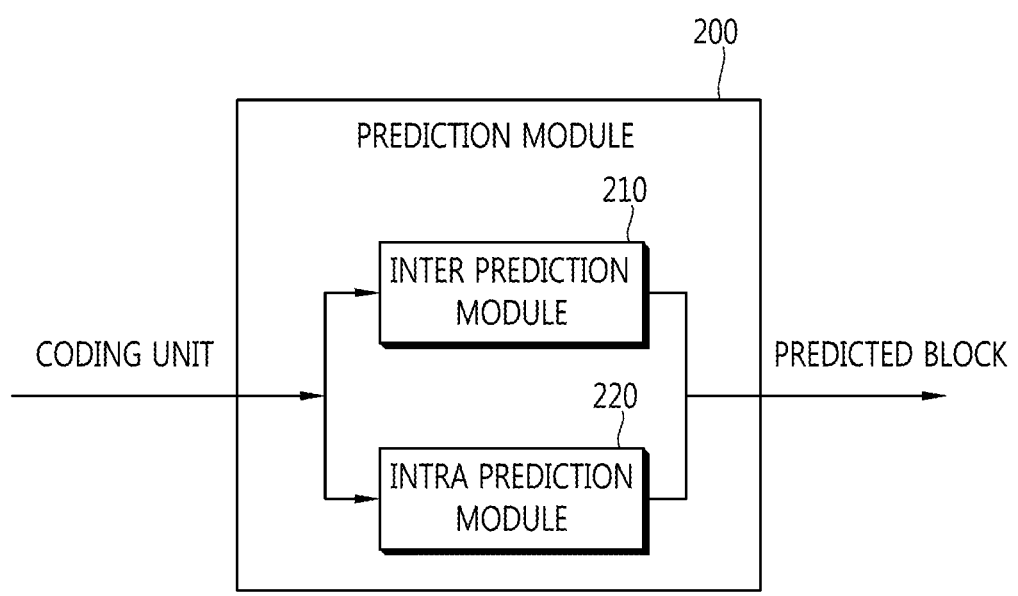
FIG. 2 is a conceptual diagram schematically illustrating a prediction module according to an embodiment of the present invention.

FIG. 2 is a conceptual diagram schematically illustrating a prediction module according to an embodiment of the present invention. Referring to FIG. 2, the prediction module 200 includes an inter prediction module 210 and an intra prediction module 220.

The inter prediction module 210 may perform a prediction process on the basis of information of at least one picture out of a previous picture and a subsequent picture of a current picture and may construct a predicted block. The intra prediction module 220 may perform a prediction process on the basis of information of pixels in the current picture and may construct a predicted block.

The intra prediction may be performed depending on an intra prediction mode of a prediction target block. The number of possible intra prediction modes of a prediction target block may be a predetermined fixed value. Examples of the intra prediction mode include a vertical mode, a horizontal mode, a DC mode, a planar mode, and angular modes depending on the positions and the prediction methods of reference pixels used to predict the pixel values of the current block. In the vertical mode, the prediction process may be performed in the vertical direction using the pixel values of neighboring blocks. In the horizontal mode, the prediction process may be performed in the horizontal direction using the pixel values of neighboring blocks. In the DC mode, a predicted block may be constructed by averaging the pixel values of the reference pixels. In the planar mode, a pixel value at a predetermined position in the current block may be first predicted and then the pixel values at the other positions in the current block may be predicted on the basis thereof. In the angular modes, the prediction process may be performed depending on an angle and/or direction pre-determined for each mode.

When the prediction target block corresponds to a depth block, a boundary intra prediction mode to be described later may be used for the intra prediction of the prediction target block. When the boundary intra prediction mode is used, for example, information on the boundary intra prediction mode may be encoded by the entropy encoding module 130 illustrated in FIG. 1 and may be transmitted to the decoder. For example, the information on the boundary intra prediction mode may be encoded by a particular device other than the entropy encoding module 130 illustrated in FIG. 1 and may be transmitted. At this time, the information on the boundary intra prediction mode may be defined in a head other than the header including information on other intra prediction mode such as the vertical mode, the horizontal mode, the DC mode, the planar mode, and the angular modes and may be processed through the use of a particular process.

Figure 3:
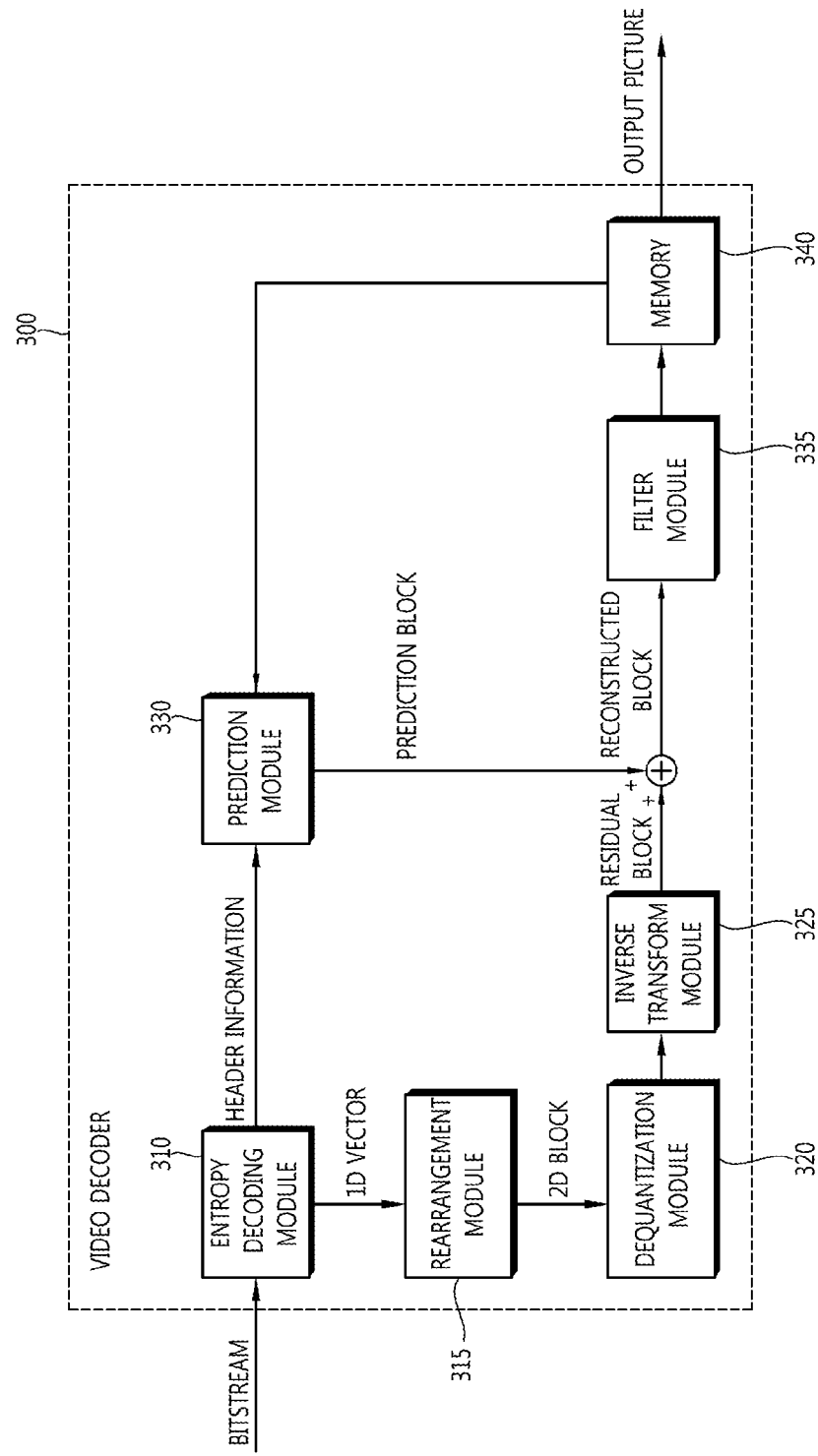
FIG. 3 is a block diagram schematically illustrating a video decoder according to an embodiment of the present invention.

FIG. 3 is a block diagram schematically illustrating a video decoder according to an embodiment of the present invention. Referring to FIG. 3, the video decoder 300 includes an entropy decoding module 310, a rearrangement module 315, a dequantization module 320, an inverse transform module 325, a prediction module 330, a filter module 335, and a memory 340. The video decoder illustrated in FIG. 3 may be applied to a texture image and a depth image, similarly to the video encoder.

When a video bitstream is input to the video decoder, the input bitstream may be decoded on the basis of the order in which video information is processed by the video encoder. At this time, the input bitstream may be a bitstream corresponding to a texture image or a bitstream corresponding to a depth image.

The entropy decoding module 310 may perform an entropy decoding process on the input bitstream, and the entropy decoding method is similar to the above-mentioned entropy encoding method. For example, when the entropy decoding is applied, a low index and a short codeword corresponding thereto may be allocated to a symbol of a high occurrence probability, and a high index and a long codeword corresponding thereto may be allocated to a symbol of a low occurrence probability. Therefore, it is possible to reduce the bit rate of the symbols to be encoded and to improve video compression performance by the entropy coding.

Information for constructing a predicted block out of the information decoded by the entropy decoding module 310 may be supplied to the prediction module 330, and the residual value entropy-decoded by the entropy decoding module may be input to the rearrangement module 315.

The rearrangement module 315 may rearrange the bitstream entropy-decoded by the entropy decoding module 310 on the basis of the rearrangement method used in the video encoder. The rearrangement module 315 may reconstruct and rearrange coefficients expressed in the form of a one-dimensional vector into coefficients in the form of a two-dimensional block. The rearrangement module 315 may be supplied with information associated with the coefficient scanning performed by the video encoder and may perform the rearrangement using a method of inversely scanning the coefficients on the basis of the scanning order in which the scanning is performed by the entropy encoding module.

The dequantization module 320 may perform dequantization on the basis of the quantization parameters supplied from the video encoder and the coefficient values of the rearranged block.

The inverse transform module 325 may perform the inverse DCT and/or inverse DST of the DCT and/or DST, which has been performed by the transform module of the video encoder, on the quantization result from the video encoder. The inverse transform may be performed on the basis of a transfer unit determined by the video encoder or a split unit of a picture. The transform module of the video encoder may selectively perform the DCT and/or DST depending on plural information pieces such as the prediction method, the size of a current block, and the prediction direction, and the inverse transform module 325 of the video decoder may perform the inverse transform on the basis of the transform information on the transform performed by the transform module of the video encoder.

The prediction module 330 may construct a predicted block on the basis of predicted block construction information supplied from the entropy decoding module 310 and the previously-decoded block and/or picture information supplied from the memory 340. The reconstructed block may be constructed using the predicted block constructed by the prediction module 330 and the residual block supplied from the inverse transform module 325.

The reconstructed block and/or picture may be supplied to the filter module 335. The filter module 335 may apply an in-loop filter to the reconstructed block and/or picture. The in-loop filter may include a deblocking filter, a sample adaptive offset (SAO), and/or an adaptive loop filter (ALF).

The memory 340 may store the reconstructed picture or block for use as a reference picture or a reference block and may supply the reconstructed picture to an output module.

Figure 4:
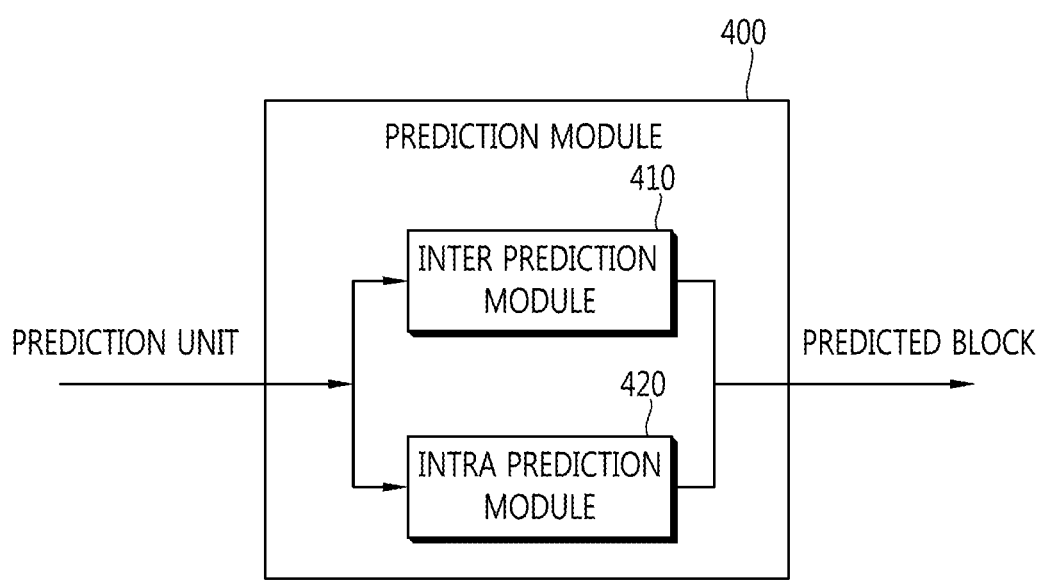
FIG. 4 is a conceptual diagram schematically illustrating a prediction module of the video decoder according to the embodiment of the present invention.

FIG. 4 is a conceptual diagram schematically illustrating the prediction module of the video decoder according to the embodiment of the invention. Referring to FIG. 4, the prediction module 400 includes an intra prediction module 410 and an inter prediction module 420.

The intra prediction module 410 may construct a predicted block on the basis of pixel information in a current picture, when the prediction mode of a prediction unit is an intra prediction mode.

As described above, the intra prediction may be performed depending on the intra prediction mode of a prediction target block. The number of possible intra prediction modes of a prediction target block may be a predetermined fixed value. Examples of the intra prediction mode include a vertical mode, a horizontal mode, a DC mode, a planar mode, and angular modes. When a prediction target block corresponds to a depth block, a boundary intra prediction mode to be described later may be applied to the intra prediction of the prediction target block. At this time, the intra prediction module 410 may perform the intra prediction on the prediction target block on the basis of information on the boundary intra prediction mode received from the video encoder. For example, the information on the boundary intra prediction mode from the video encoder may be information encoded by the entropy encoding module 130 illustrated in FIG. 1. At this time, the encoded information on the boundary intra prediction mode may be decoded by the entropy decoding module 310 and may be used for the intra prediction. For example, the information on the boundary intra prediction mode may be decoded by a particular device other than the entropy decoding module 310 illustrated in FIG. 3 and may be input to the intra prediction module 410. At this time, the information on the boundary intra prediction mode may be defined in a head other than the header including information on other intra prediction mode such as the vertical mode, the horizontal mode, the DC mode, the planar mode, and the angular modes and may be processed through the use of a particular process.

The inter prediction module 420 may perform an inter prediction process on a current prediction unit on the basis of the information included in at least one picture out of a previous picture or a subsequent picture of a current picture including the current prediction unit using information necessary for inter prediction of the current prediction unit which is supplied from the video encoder, for example, information on the motion vector and the reference picture index, when the prediction mode of the corresponding prediction unit is an inter prediction mode.

Hereinafter, when a "video" or a "screen" has the same meaning as a "picture" in some configurations or expressions of the invention, a "picture" may be described as a "video" or a "screen".

As described above with reference to FIGS. 2 and 4, the intra prediction module 220 of the video encoder and the intra prediction module 420 of the video decoder may perform the intra prediction depending on the intra prediction mode of a prediction target block. At this time, the video encoder may transmit the intra prediction mode information used for prediction to the video decoder and the video decoder may determine the intra prediction mode on the basis of the transmitted information. Infra prediction mode information may be transmitted as a value itself indicating the prediction mode, but a method of transmitting the intra prediction mode information using a predicted mode value of the intra prediction mode may be used to improve the transmission efficiency. Hereinafter, a predicted mode of a current intra prediction mode is referred to as a most probable mode (MPM).

Figure 5:
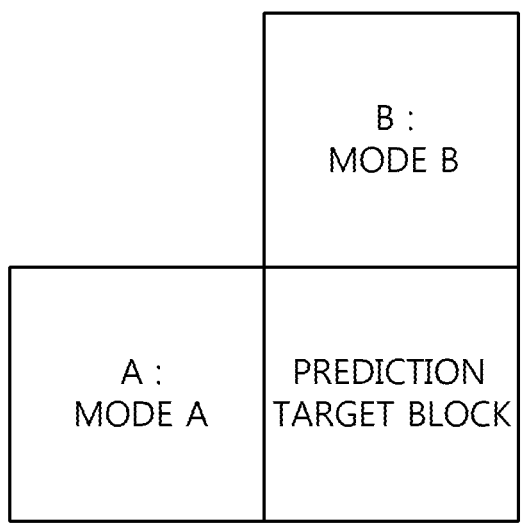
FIG. 5 is a diagram illustrating an intra prediction mode deriving method based on an MPM and a remaining mode.

FIG. 5 is a diagram illustrating an intra prediction mode deriving method based on an MPM and a remaining mode.

In the example illustrated in FIG. 5, a prediction target block may mean a block on which a prediction process is currently performed. Hereinafter, the prediction mode of the prediction target block in the example illustrated in FIG. 5 is referred to as a current prediction mode and the mode value of the current prediction mode is referred to as a current mode value.

In FIG. 5, A represents an upper neighboring block adjacent to the top of a prediction target block and B represents a left neighboring block adjacent to the left side of the prediction target block. The upper neighboring block A, the left neighboring block B, and the prediction target block may have the same size as illustrated in FIG. 5, or may have different sizes.

Referring to FIG. 5, the intra prediction module may construct an MPM candidate list on the basis of the prediction mode (mode A) of the upper neighboring block A and the prediction mode (mode B) of the left neighboring block B. Here, the number of MPM candidates constituting the MPM candidate list may be a fixed value. For example, the fixed value may be 3. For example, when it is assumed that three MPM candidates are always used in the example illustrated in FIG. 5 and mode A and mode B are equal to each other, the number of MPM candidates derived may be 1 and thus the other MPM candidates may be set to the DC mode, the planar mode, or other predetermined prediction modes.

The intra prediction mode of a prediction target block may be the same prediction mode as one of the MPM candidates. Information on whether a candidate having the same prediction mode as the prediction target block is present in the MPM candidates may be transmitted from the video encoder to the video decoder via an MPM flag indicating the information. The MPM flag may be, for example, prev_intra_luma_pred_flag. When the flag is 1, a candidate having the same prediction mode as the prediction target block may be present in the MPM candidates.

When the flag is 1 and the number of MPM candidates is 2 or more, the video encoder may transmit an MPM index indicating whether the prediction mode of the prediction target block is equal to which prediction mode of the MPM candidates. The decoder may determine the prediction mode of the prediction target block on the basis of the MPM index. For example, the MPM index may be expressed by mpm_idx.

When all the prediction modes of the MPM candidates are different from the prediction mode of the prediction target block, for example, when the value of the flag indicating whether a candidate having the same prediction mode as the prediction target block is present in the MPM candidates is 0, the video encoder may transmit intra prediction mode information of the prediction target block to the decoder using a remaining mode.

When all the prediction modes of the MPM candidates are different from the current prediction mode, the video encoder may transmit the information on the current prediction mode out of the prediction modes other than the MPM candidates to the video decoder. Here, the video encoder may transmit the prediction mode information using the current mode value when the mode values of all the MPM candidates are greater than the current mode value, and may transmit the prediction mode information using a value obtained by subtracting the number of MPM candidates having a mode value smaller than the current mode value from the current mode value when an MPM candidate having a mode value smaller than the current mode value is present. Here, a prediction mode having a mode value obtained by subtracting the number of MPM candidates having a mode value smaller than the current mode value from the current mode value may be referred to as a remaining mode. For example, the remaining mode may be expressed by rem_intra_luma_pred_mode.

The video decoder may know that a candidate having the same prediction mode as the prediction target block is not present in the MPM candidates through the use of the flag information such as prev_intra_luma_pred_flag.

Here, the decoder may calculate an actual prediction mode value of the current prediction unit using the remaining mode and the MPM. For example, it is assumed that the number of MPMs is N and the mode values of the MPM are mode1, mode2, . . . , modeN. Here, it is assumed that the smaller the X value modeX is, the smaller mode value is allocated. When X ranges from 1 to N−1 and the mode value of the remaining mode is greater than or equal to modeX−(X−1) and smaller than mode(X+1)−X, a value obtained by adding X to the mode value of the remaining mode may be the current prediction mode. When X is N and the mode value of the remaining mode is greater than or equal to modeN−(N−1), a value obtained by adding N to the mode value of the remaining mode may be the current prediction mode.

When the remaining mode is used, it is possible to reduce the bit rate necessary for transmitting the intra prediction mode of the prediction target block and thus to enhance the coding efficiency.

In the above-mentioned embodiment, information on the intra prediction mode transmitted from the video encoder to the video decoder for each prediction unit can be expressed by syntax elements shown in Table 1.

TABLE 1

```
prediction_unit( ) {
    ...
    prev_intra_luma_pred_flag[ x0 ][ y0 ]
    if( prev_intra_luma_pred_flag[ x0 ][ y0 ] )
        if( NumMPMCand > 1 )
            mpm_idx[ x0 ][ y0 ]
    else
        rem_intra_luma_pred_mode[ x0 ][ y0 ]
    if( IntraPredMode[ x0 ][ y0 ] == 2 )
        planar_flag_luma[ x0 ][ y0 ]
    ...
}
```

Here, prev_intra_luma_pred_flag represents the MPM flag and NumMPMCand represents the number of MPM candidates in the MPM list. In addition, mpm_idx represents the MPM index, and rem_intra_luma_pred_mode represents the remaining mode. IntraPredMode represents an intra prediction mode, and planar_flag_luma is a flag indicating whether the intra prediction mode of a current prediction unit is a planar mode.

Referring to Table 1, the intra prediction mode information may be defined as a relevant syntax in prediction_unit( ) included in a syntax coding_unit( ). As described above, the number of MPM candidates in the MPM list may be a predetermined fixed value. When the fixed number of MPM candidates is 2 or more, the number of MPM candidates is always greater than 1 and thus "if(NumMPMCand>1)" in the examples shown in Table 1 may be skipped. "if(IntraPredMode[x0][y0])=2)" and "planar_flag_luma[x0][y0]" in the example shown in Table 1 may be skipped depending on the setting of the intra prediction mode indicated by each mode value.

Figure 6:
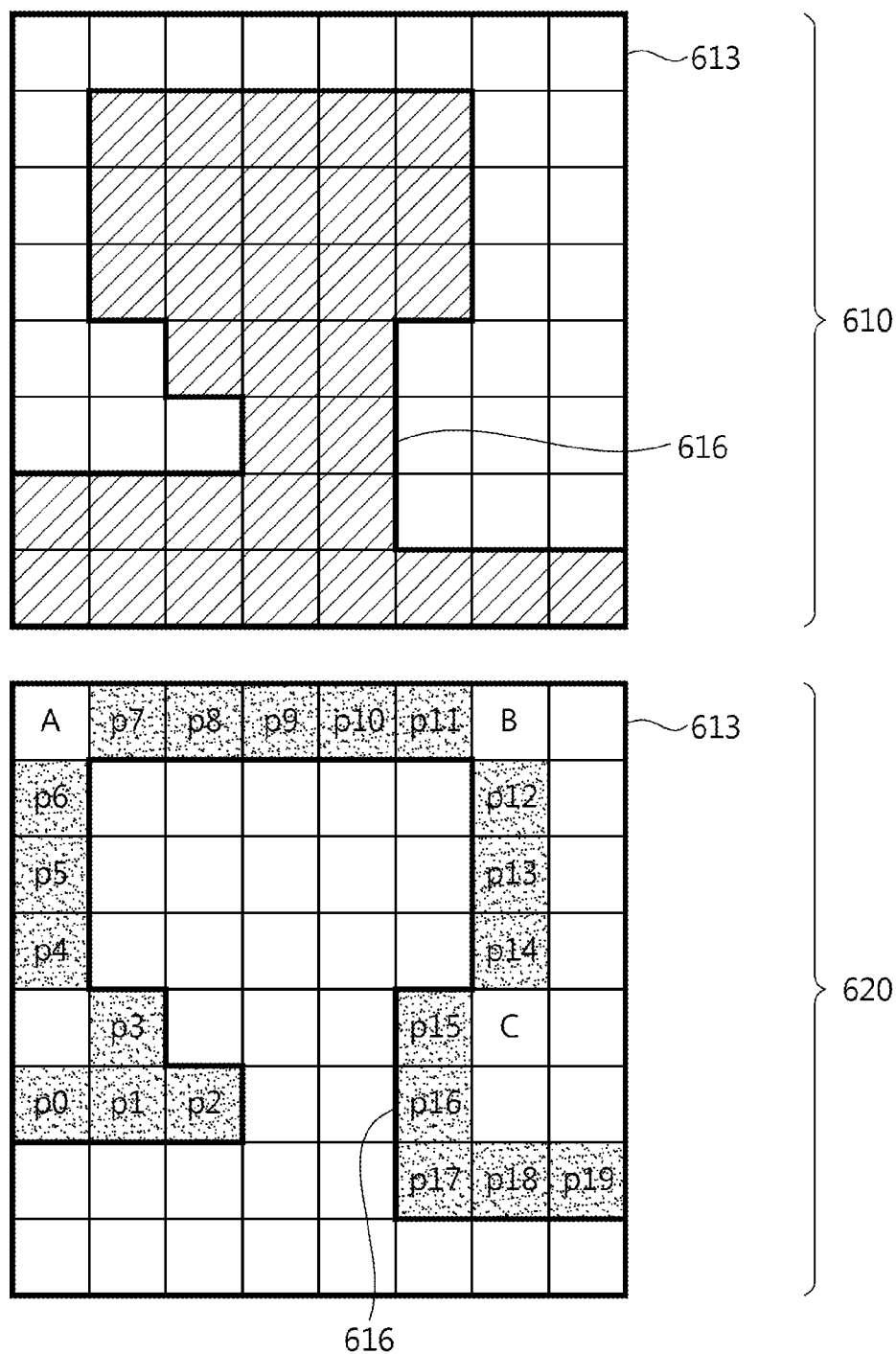
FIG. 6 is a diagram schematically illustrating characteristics of a depth image of a 3D video.

FIG. 6 is a diagram schematically illustrating characteristics of a depth image of a 3D video.

As described above, in a 3D video, a depth image as well as a texture image can be encoded and/or decoded. The depth image, the depth picture, and/or the depth block may be referred to as a depth map, in that they indicates depth information of objects in a screen. In the below description, the pixel values in the depth image, the depth picture, and the depth block, and/or the depth map may be referred to as depth pixel values or depth values.

In general, pixels of the same object in a depth image have a similar depth value, and discontinuity in depth value may occur between different objects and a strong edge and/or a boundary may be present therebetween. That is, a depth image has characteristics that the difference in pixel value between regions split by a boundary of an object is not great and the difference in pixel value between pixels belonging to different regions with respect to the boundary of the object. Therefore, in a depth image, a boundary of an object having a complex shape may be often expressed as a sharp edge.

Hereinafter, a boundary of an object present in a picture and/or block in the below description may be referred to as an edge.

Referring to 610 in FIG. 6, one depth block 613 may include an edge 616 corresponding to a boundary of an object (object boundary) in a screen. Here, the depth block 613 may be a prediction target block corresponding to one prediction unit.

In 610 of FIG. 6, the depth block 613 may be split into two regions based on the object boundary 616. Here, the two regions may indicate different objects. Pixels indicating the same object in each region may have a similar depth value. Discontinuity in depth value occurs between the two regions and a strong edge 616 may be present. In a depth image, since accuracy in the vicinity of an object boundary in a screen has a large influence on image quality of the depth image, it is important to perform a coding process so as to preserve the boundary well.

On the other hand, intra prediction may be performed on the basis of the intra prediction mode of the prediction target block. As described above, examples of the intra prediction mode to be applied to the intra prediction include the DC mode, the planar mode, and the uni-directional modes (vertical, horizontal, and angular). With these intra prediction modes, it is possible to efficiently compress a texture image including lama components and chroma components. However, it may be difficult to perform efficient prediction on the depth block having a boundary of an arbitrary shape like 610 of FIG. 6.

Therefore, when a block includes a strong edge, an intra prediction method using an edge position and shape information may be applied to preserve edge information well. Particularly, a depth image may be effectively compressed through a region prediction process which can support an arbitrary boundary shape rather than DC mode prediction, planar mode prediction, and uni-directional mode prediction due to the above-mentioned characteristics.

Specifically, the intra prediction module may determine a pixel boundary in a prediction target block. Here, the boundary may be indicated and/or determined by boundary pixels adjacent to the boundary.

In FIG. 6, 620 represents examples of boundary pixels indicating the boundary 616 in the prediction target block 613. As illustrated in FIG. 6, the boundary pixels may be pixels adjacent to the boundary 616. For example, pixels (for example, pixel A, pixel B, and pixel C) located at the corners of the boundary 616 may be additionally considered as boundary pixels. In 620 of FIG. 6, it is assumed that only the pixels adjacent to the boundary 616 other than pixel A, pixel B, and pixel C correspond to the boundary pixels.

Referring to 620 of FIG. 6, plural boundary pixels adjacent to the boundary 616 of an object may be sequentially arranged along the progress direction of the boundary 616. At this time, the boundary pixel located at a start point of the boundary may be referred to as a start boundary pixel, and the boundary pixel located at an end point of the boundary may be referred to as an end boundary pixel. The start boundary pixel may be a pixel located at the leftmost position in the prediction target block 613 or a pixel located at the uppermost position in the prediction target block 613. 620 of FIG. 6 represents an example where the start boundary pixel is a pixel located at the leftmost position in the prediction target block 613.

In the below description, when N boundary pixels (where N is a positive integer) are present in a prediction target block, the boundary pixels from the start boundary pixel to the end boundary pixel are referenced by $p_0, p_1, \ldots, p_n, \ldots,$ and $p_{N-1}$ (where n is an integer of 0 to N−1). Here, $p_0$ represents the start boundary pixel and $p_{N-1}$ represents the end boundary pixel. $p_0$ to $p_{N-1}$ may correspond to boundary pixels which are sequentially arranged along the progress direction of the boundary. In 620 of FIG. 6, 20 boundary pixels are present in the prediction target block 613 and the boundary pixels are referenced by $p_0$ to $p_{19}$ sequentially along the progress direction of the boundary 616.

The boundary pixels may be located on the left side of the boundary based on the progress direction of the boundary or may be located on the right side of the boundary. 620 of FIG. 6 represents an example where all the boundary pixels are located on the left side of the boundary 616 based on the progress direction. Hereinafter, in the below description, it is assumed that all the boundary pixels in a prediction target block are located on the left side with respect to the progress direction of the boundary present in the prediction target block for the purpose of convenience of explanation.

On the other hand, in 620 of FIG. 6, the boundary pixels sequentially arranged along the boundary 616 may be considered to constitute one chain (and/or line). In the below description, the chain formed by the boundary pixels in the prediction target block in this way is referred to as a boundary pixel chain. In 620 of FIG. 6, the boundary pixels $p_0$ to $p_{19}$ can be considered to form one boundary pixel chain.

When the video encoder determines a pixel boundary in a prediction target block, the video encoder may encode and transmit information on the boundary pixels corresponding to the determined boundary to the video decoder. At this time, the intra prediction module of the video decoder may determine a boundary in the prediction target block by determining searching for or determining the boundary pixels on the basis of the transmitted information. Specific examples of the method of encoding the information on the boundary pixels and the method of determining the boundary on the basis of the boundary pixels will be described later.

When the boundary in the prediction target block is determined, the prediction target block may split into plural regions on the basis of the determined boundary. At this time, the intra prediction module may perform a prediction process on the plural regions by regions. For example, when plural neighboring pixels located adjacent to the prediction target block are used for the intra prediction, the intra prediction module may perform the prediction process on the plural regions on the basis of different neighboring pixels out of the neighboring pixels. A specific example of the method of performing a prediction process on the plural regions in the prediction target block will be described later.

As described above, the intra prediction module may perform the prediction process on the plural regions split by the boundary in the prediction target block by regions. In the below description, the intra prediction mode in which the prediction process of this type is performed is referred to as a boundary intra prediction mode.

Figure 7:
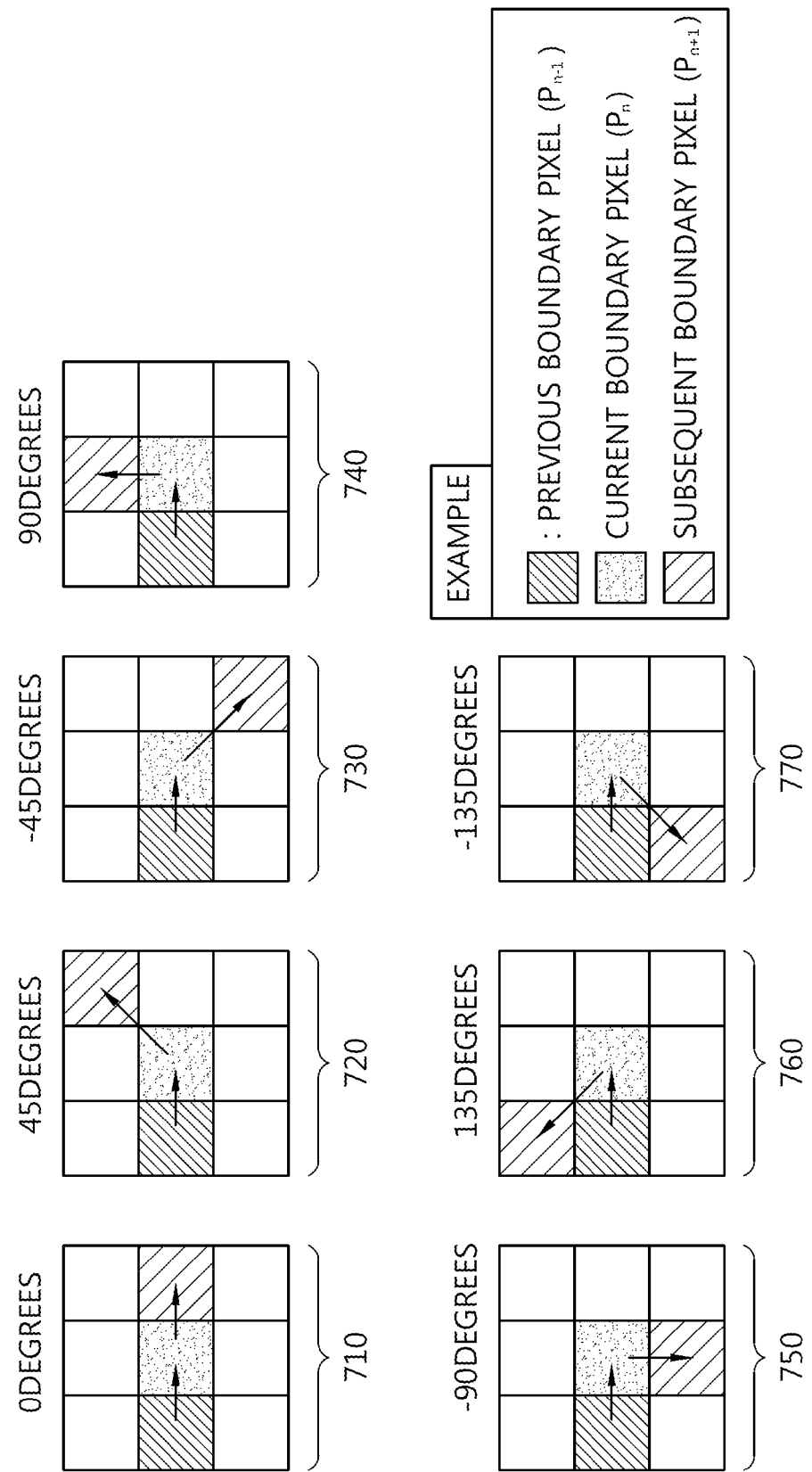
FIG. 7 is a diagram schematically illustrating an example of a method of encoding information on boundary pixels constituting a boundary pixel chain.

FIG. 7 is a diagram schematically illustrating an example of the method of encoding the information on the boundary pixels forming a boundary pixel chain.

710 to 770 of FIG. 7 represent pixel blocks with a 3×3 size present in a prediction target block, respectively, and the arrow marked in each 3×3 block indicates the progress direction of a boundary pixel chain. In FIG. 7, a pixel located at the center of each 3×3 block represents a boundary pixel $p_n$ corresponding to the information which is currently encoded in the boundary pixel chain. In the examples illustrated in FIG. 7, the boundary pixel $p_n$ is referred to as a "current boundary pixel". In the examples illustrated in FIG. 7, the boundary pixel $p_{n-1}$ located just previously to the current boundary pixel in the boundary pixel chain is referred to as a "previous boundary pixel". In the examples illustrated in FIG. 7, the boundary pixel $p_{n+1}$ located just subsequent to the current boundary pixel in the boundary pixel chain is referred to as a "subsequent boundary pixel".

The boundary pixel information corresponding to the current boundary pixel $p_n$ may be encoded on the basis of the previous boundary pixel $p_{n-1}$, the current boundary pixel $p_n$, and the subsequent boundary pixel $p_{n+1}$. At this time, the boundary pixel information corresponding to the current boundary pixel $p_n$ may be information indicating an angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$.

The information may be expressed by a code (and/or codewords) including a line of binary numerals depending on the angle (and/or the angle difference). In the below description, a code indicating the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ is referred to as a chain code.

710 to 770 of FIG. 7 represent examples where the previous boundary pixel $p_{n-1}$ is a pixel located adjacent to the left side of the current boundary pixel $p_n$. However, the present invention is not limited to these examples and the examples to be described below will be applied identically or similarly even when the previous boundary pixel $p_{n-1}$ is present at another relative position to the current boundary pixel $p_n$.

Referring to 710 of FIG. 7, the subsequent boundary pixel $p_{n+1}$ may be located adjacent to the right side of the current boundary pixel $p_n$. In this case, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be 0 degrees.

Referring to 720 of FIG. 7, the subsequent boundary pixel $p_{n+1}$ may be located adjacent to the upper side of the pixel adjacent to the right side of the current boundary pixel $p_n$. In this case, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be 45 degrees.

Referring to 730 of FIG. 7, the subsequent boundary pixel $p_{n+1}$ may be located adjacent to the lowermost end of the pixel adjacent to the right side of the current boundary pixel $p_n$. In this case, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be −45 degrees.

Referring to 740 of FIG. 7, the subsequent boundary pixel $p_{n+1}$ may be located adjacent to the upper side of the current boundary pixel $p_n$. In this case, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be 90 degrees.

Referring to 750 of FIG. 7, the subsequent boundary pixel $p_{n+1}$ may be located adjacent to the lowermost end of the current boundary pixel $p_n$. In this case, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be −90 degrees.

Referring to 760 of FIG. 7, the subsequent boundary pixel $p_{n+1}$ may be located adjacent to the left side of a pixel adjacent to the upper side of the current boundary pixel $p_n$. In this case, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be 135 degrees.

Referring to 770 of FIG. 7, the subsequent boundary pixel $p_{n+1}$ may be located adjacent to the left side of a pixel adjacent to the lowermost end of the current boundary pixel $p_n$. In this case, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be −135 degrees.

In the above-mentioned examples, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be expressed as one angle of seven angles. Each of the seven angles may be specified by a chain code. For example, 0 degrees corresponds to chain code "0", 45 degrees corresponds to chain code "10", and −45 degrees corresponds to chain code "110". 90 degrees corresponds to chain code "1110", −90 degrees corresponds to chain code "11110", 135 degrees corresponds to chain code "111110", and −135 degrees corresponds to chain code "111111", The chain code may be derived for each boundary pixel forming the boundary pixel chain in the prediction target block. Therefore, plural chain codes may be derived depending on the number of boundary pixel chains included in one prediction target block. Here, when the current boundary pixel $p_n$ corresponds to the end boundary pixel located finally in the boundary pixel chain, the subsequent boundary pixel $p_{n+1}$ is not present and thus the chain code for the current boundary pixel $p_n$ may not be derived.

When the chain codes for the boundary pixels in the prediction target block are derived, the chain codes may be included in a bitstream and may be transmitted from the video encoder to the video decoder. Then, the intra prediction module of the video decoder may determine the boundary of the prediction target block by searching for or determining the boundary pixels in the prediction target block on the basis of the transmitted chain codes.

Figure 8:
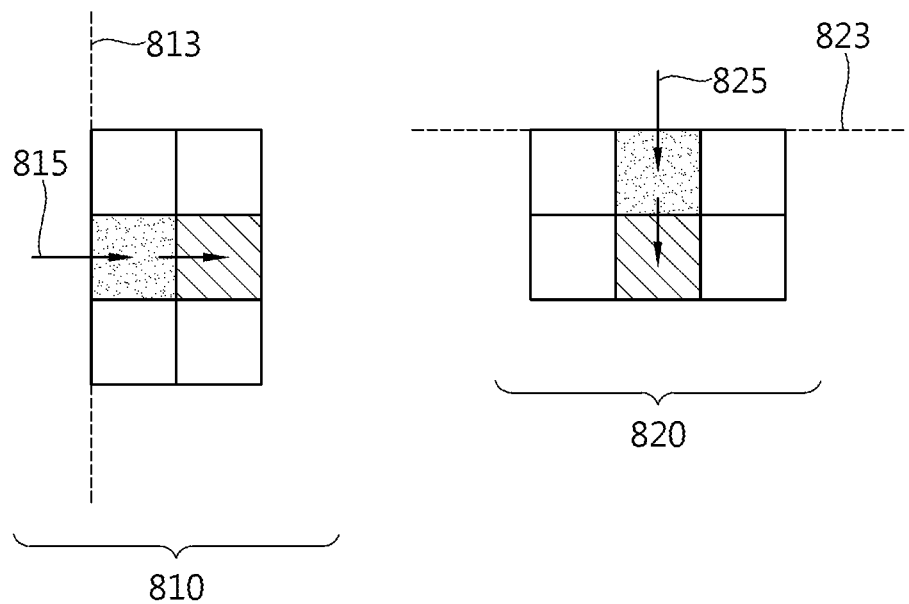
FIG. 8 is a diagram schematically illustrating an example of a method of deriving a chain code when a boundary pixel corresponding to information to be currently encoded is a start boundary pixel.

FIG. 8 is a diagram schematically illustrating an example of the method of deriving a chain code when the boundary pixel corresponding to information to be currently encoded is a start boundary pixel.

810 of FIG. 8 represents a pixel block with a size of 2×3 adjacent to the leftmost position in a prediction target block, and 813 of FIG. 8 represents the left boundary of the prediction target block. 820 of FIG. 8 represents a pixel block with a size of 3×2 adjacent to the upper side in the prediction target block, and 823 of FIG. 8 represents the upper boundary of the prediction target block Arrows marked in 810 and 820 of FIG. 8 represent progress directions of a boundary pixel chain.

In the example illustrated in FIG. 8, the boundary pixel $p_n$ corresponding to the information to be currently encoded in the boundary pixel chain is referred to as a "current boundary pixel". In the example illustrated in FIG. 8, the boundary pixel $p_{n-1}$ located just previous to the current boundary pixel in the boundary pixel chain is referred to as a "previous boundary pixel" and the boundary pixel $p_{n+1}$ located just subsequent to the current boundary pixel in the boundary pixel chain is referred to as a "subsequent boundary pixel".

As described above, the chain code may indicate the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$. However, when the current boundary pixel $p_n$ is a start boundary pixel p0 adjacent to the leftmost position or adjacent to the upper side in the prediction target block, the previous boundary pixel $p_{n-1}$ may not be present.

810 of FIG. 8 represents an example where the current boundary pixel $p_n$ is a start boundary pixel located at the leftmost position in a prediction target block. In this case, a boundary pixel chain may be considered to start from the left side in the prediction target block.

In 810 of FIG. 8, since the current boundary pixel $p_n$ is the start boundary pixel located at the leftmost position in the prediction target block, a previous boundary pixel $p_{n-1}$ may not be present. In this case, as illustrated in 815 of FIG. 8, the pixel adjacent to the left side of the start boundary pixel may be considered as a previous boundary pixel, and the progress direction from the previous boundary pixel to the current boundary pixel may be considered as or set to be the right horizontal direction.

Here, for example, a subsequent boundary pixel may be a pixel located adjacent to the right side of the current boundary pixel as illustrated in 810 of FIG. 8. In this case, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be 0 degrees. Therefore, the chain code derived from 810 of FIG. 8 may be, for example, "0".

820 of FIG. 8 represents an example where the current boundary pixel $p_n$ is a start boundary pixel located at the uppermost position in a prediction target block. In this case, a boundary pixel chain may be considered to start from the uppermost position in the prediction target block.

In 820 of FIG. 8, since the current boundary pixel $p_n$ is the start boundary pixel located at the uppermost position in the prediction target block, a previous boundary pixel $p_{n-1}$ may not be present. In this case, as illustrated in 825 of FIG. 8, the pixel adjacent to the uppermost position of the start boundary pixel may be considered as a previous boundary pixel, and the progress direction from the previous boundary pixel to the current boundary pixel may be considered as or set to be the lower vertical direction.

Here, for example, a subsequent boundary pixel may be a pixel located adjacent to the lowermost position of the current boundary pixel as illustrated in 820 of FIG. 8. In this case, the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ may be 0 degrees. Therefore, the chain code derived from 810 of FIG. 8 may be, for example, "0".

Figure 9:
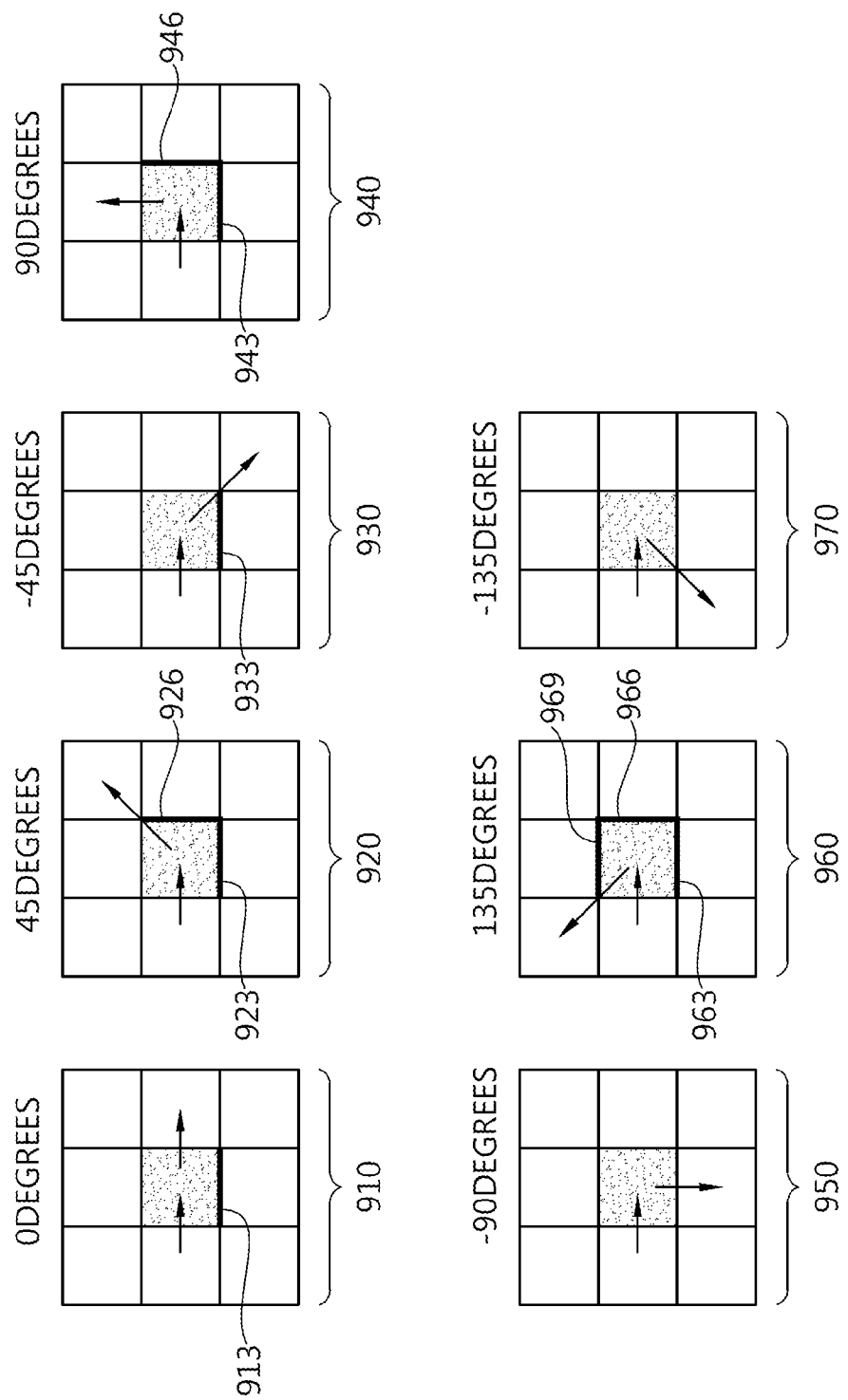
FIG. 9 is a diagram schematically illustrating an example of a method of determining a pixel boundary on the basis of the chain code of the boundary pixels.

FIG. 9 is a diagram schematically illustrating an example of a method of determining a pixel boundary on the basis of a chain code of boundary pixels.

910 to 970 of FIG. 9 represent blocks of a 3×3 size present in a prediction target block, and arrows illustrated in the blocks represent the progress directions of boundary pixel chains. A pixel located at the center of each 3×3 block illustrated in FIG. 9 represents a boundary pixel $p_n$ to which a chain code is currently applied. In the example illustrated in FIG. 9, the boundary pixel $p_n$ to which a chain code is currently applied is referred to as a "current boundary pixel", and the chain code applied to the current boundary pixel $p_n$ is referred to as a "current chain code". In the example illustrated in FIG. 9, the boundary pixel $p_{n-1}$ located just previous to the current boundary pixel in the boundary pixel chain is referred to as a "previous boundary pixel", and a boundary pixel $p_{n+1}$ located just subsequent to the current boundary pixel in the boundary pixel chain is referred to as a "subsequent boundary pixel".

As described above, the chain code created by the video encoder may be included in a bitstream and may be transmitted to the video decoder. Here, the chain code may indicate the angle (and/or angle difference) between the progress direction from the previous boundary pixel $p_{n-1}$ to the current boundary pixel $p_n$ and the progress direction from the current boundary pixel $p_n$ to the subsequent boundary pixel $p_{n+1}$ as described above. At this time, the video decoder may searching for or determining boundary pixels in a prediction target block on the basis of the transmitted chain code and may determine a boundary in the prediction target block.

Specifically, after a previous boundary pixel and a current boundary pixel are determined, the video decoder may determine a partial boundary adjacent to the current boundary pixel on the basis of the current chain code corresponding to the current boundary pixel. Here, the partial boundary may mean a part adjacent to the current boundary pixel in the boundary present in the prediction target block.

The partial boundary adjacent to the current boundary pixel may be determined on the basis of the first progress direction from the previous boundary pixel $p_{n-1}$ to the current boundary pixel $p_n$ and the second progress direction from the current boundary pixel $p_n$ to the subsequent boundary pixel $p_{n+1}$. That is, the partial boundary corresponding to the current boundary pixel may be determined on the basis of the progress direction of the boundary pixel chain.

For example, as described with reference to FIG. 6, all the boundary pixels forming a boundary pixel chain may be located on the left side along the progress direction of the boundary. At this time, the video decoder may determine only a boundary (a boundary of the current boundary pixel) located on the right side relative to both the first progress direction and the second progress direction as the partial boundary. For example, all the boundary pixels forming a boundary pixel chain may be located on the right side along the progress direction of the boundary. At this time, the video decoder may determine only a boundary (a boundary of the current boundary pixel) located on the left side relative to both the first progress direction and the second progress direction as the partial boundary. In the example illustrated in FIG. 9, it is assumed that only the boundary located on the right side relative to both the first progress direction and the second progress direction is determined to be the partial boundary corresponding to the current boundary pixel.

When a chain code is applied to the current boundary pixel $p_n$, the video encoder knows the progress direction from the previous boundary pixel $p_{n-1}$ to the current boundary pixel $p_n$ and thus may determine the position of the subsequent boundary pixel $p_{n+1}$ along the progress direction indicated with respect to the current boundary pixel $p_n$ on the basis of the angle indicated by the chain code. That is, the boundary pixel $p_{n+1}$ may be determined along the progress direction indicated with respect to the boundary pixel $p_n$ on the basis of the chain code. Similarly, the current boundary pixel $p_n$ may be a boundary pixel determined along the progress direction indicated with respect to the previous boundary pixel $p_{n-1}$ on the basis of the chain code of the previous boundary pixel $p_{n-1}$. When the subsequent boundary pixel $p_{n+1}$ is determined, the chain code may be applied to the determined subsequent boundary pixel $p_{n+1}$ and the above-mentioned boundary determining process may be performed in the same way.

As described above, the video decoder may determine the whole boundary in the prediction target block by sequentially searching for and determining the boundary pixels along the progress direction from the start boundary pixel on the basis of the chain code and determining the partial boundaries corresponding to the determined boundary pixels. Since the chain code may be applied to each of the plural boundary pixels, the number of chain codes transmitted from the video encoder to the video decoder may be two or more. At this time, an index value may be allocated to each of the plural chain codes. The chain codes may be applied to the boundary pixels in the order in which the allocated index value becomes larger.

That is, a chain code having a lower index value may be applied to a boundary pixel earlier determined along the progress direction of the boundary pixel chain.

910 to 970 of FIG. 9 represent an example where the previous boundary pixel $p_{n-1}$ is a pixel located adjacent to the left side of the current boundary pixel $p_n$. In this case, the progress direction from the previous boundary pixel $p_{n-1}$ to the current boundary pixel $p_n$ may be the right horizontal direction.

Referring to 910 of FIG. 9, the chain code may indicate an angle of 0 degrees. At this time, the progress direction from the current boundary pixel $p_n$ to the subsequent boundary pixel $p_{n+1}$ may be the right horizontal direction. Accordingly, the subsequent boundary pixel $p_{n+1}$ may be determined to be a pixel located adjacent to the right side of the current boundary pixel $p_n$.

In 910 of FIG. 9, a boundary located on the left side relative to the progress direction of the boundary pixel chain in the boundary of the current boundary pixel $p_n$ is a lower boundary 913 of the current boundary pixel $p_n$. Accordingly, the lower boundary 913 of the current boundary pixel $p_n$ may be determined to be the partial boundary corresponding to the current boundary pixel $p_n$.

Referring to 920 of FIG. 9, the chain code may indicate an angle of 45 degrees. At this time, the progress direction from the current boundary pixel $p_n$ to the subsequent boundary pixel $p_{n+1}$ may be a direction of 45 degrees about the right horizontal direction. Accordingly, the subsequent boundary pixel $p_{n+1}$ may be determined to be a pixel located at the right-upper position of the current boundary pixel $p_n$.

In 920 of FIG. 9, a boundary located on the left side relative to the progress direction of the boundary pixel chain in the boundary of the current boundary pixel $p_n$ is a lower boundary 923 and a right boundary 926 of the current boundary pixel $p_n$. Accordingly, the lower boundary 923 and the right boundary 926 of the current boundary pixel $p_n$ may be determined to be the partial boundary corresponding to the current boundary pixel $p_n$.

Referring to 930 of FIG. 9, the chain code may indicate an angle of −45 degrees. At this time, the progress direction from the current boundary pixel $p_n$ to the subsequent boundary pixel $p_{n+1}$ may be a direction of −45 degrees about the right horizontal direction. Accordingly, the subsequent boundary pixel $p_{n+1}$ may be determined to be a pixel located at the right-lower position of the current boundary pixel $p_n$.

In 930 of FIG. 9, a boundary located on the left side relative to the progress direction of the boundary pixel chain in the boundary of the current boundary pixel $p_n$ is a lower boundary 933 of the current boundary pixel $p_n$. Accordingly, the lower boundary 933 of the current boundary pixel $p_n$ may be determined to be the partial boundary corresponding to the current boundary pixel $p_n$.

Referring to 940 of FIG. 9, the chain code may indicate an angle of 90 degrees. At this time, the progress direction from the current boundary pixel $p_n$ to the subsequent boundary pixel $p_{n+1}$ may be the upper vertical direction. Accordingly, the subsequent boundary pixel $p_{n+1}$ may be determined to be a pixel located adjacent to the upper end of the current boundary pixel $p_n$.

In 940 of FIG. 9, a boundary located on the left side relative to the progress direction of the boundary pixel chain in the boundary of the current boundary pixel $p_n$ is a lower boundary 943 and a right boundary 946 of the current boundary pixel $p_n$. Accordingly, the lower boundary 943 and the right boundary 946 of the current boundary pixel $p_n$ may be determined to be the partial boundary corresponding to the current boundary pixel $p_n$.

Referring to 950 of FIG. 9, the chain code may indicate an angle of −90 degrees. At this time, the progress direction from the current boundary pixel $p_n$ to the subsequent boundary pixel $p_{n+1}$ may be the lower vertical direction. Accordingly, the subsequent boundary pixel $p_{n+1}$ may be determined to be a pixel located adjacent to the lower end of the current boundary pixel $p_n$.

In 950 of FIG. 9, a boundary located on the left side relative to the progress direction of the boundary pixel chain may not be present in the boundary of the current boundary pixel $p_n$. Accordingly, the partial boundary corresponding to the current boundary pixel $p_n$ may not be determined to be present in 950 of FIG. 9.

Referring to 960 of FIG. 9, the chain code may indicate an angle of 135 degrees. At this time, the progress direction from the current boundary pixel $p_n$ to the subsequent boundary pixel $p_{n+1}$ may be a direction of 135 degrees with respect to the right horizontal direction. Accordingly, the subsequent boundary pixel $p_{n+1}$ may be determined to be a pixel located at the left-upper position of the current boundary pixel $p_n$.

In 960 of FIG. 9, a boundary located on the left side relative to the progress direction of the boundary pixel chain in the boundary of the current boundary pixel $p_n$ is a lower boundary 963, a right boundary 966, and an upper boundary 969 of the current boundary pixel $p_n$. Accordingly, the lower boundary 963, the right boundary 966, and the upper boundary 969 of the current boundary pixel $p_n$ may be determined to be the partial boundary corresponding to the current boundary pixel $p_n$.

Referring to 970 of FIG. 9, the chain code may indicate an angle of −135 degrees. At this time, the progress direction from the current boundary pixel $p_n$ to the subsequent boundary pixel $p_{n+1}$ may be a direction of −135 degrees with respect to the right horizontal direction. Accordingly, the subsequent boundary pixel $p_{n+1}$ may be determined to be a pixel located at the left-lower position of the current boundary pixel $p_n$.

In 970 of FIG. 9, a boundary located on the left side relative to the progress direction of the boundary pixel chain may not be present in the boundary of the current boundary pixel $p_n$. Accordingly, the partial boundary corresponding to the current boundary pixel $p_n$ may not be determined to be present in 970 of FIG. 9.

It is assumed in the above-mentioned examples that the previous boundary pixel $p_{n-1}$ is a pixel located adjacent to the left side of the current boundary pixel $p_n$, but the present invention is not limited to these examples. For example, the boundary determining method in the examples may be identically or similarly applied even when the previous boundary pixel $p_{n-1}$ is located adjacent to the upper end, the lower end, and/or the right side of the current boundary pixel $p_n$.

Figure 10:
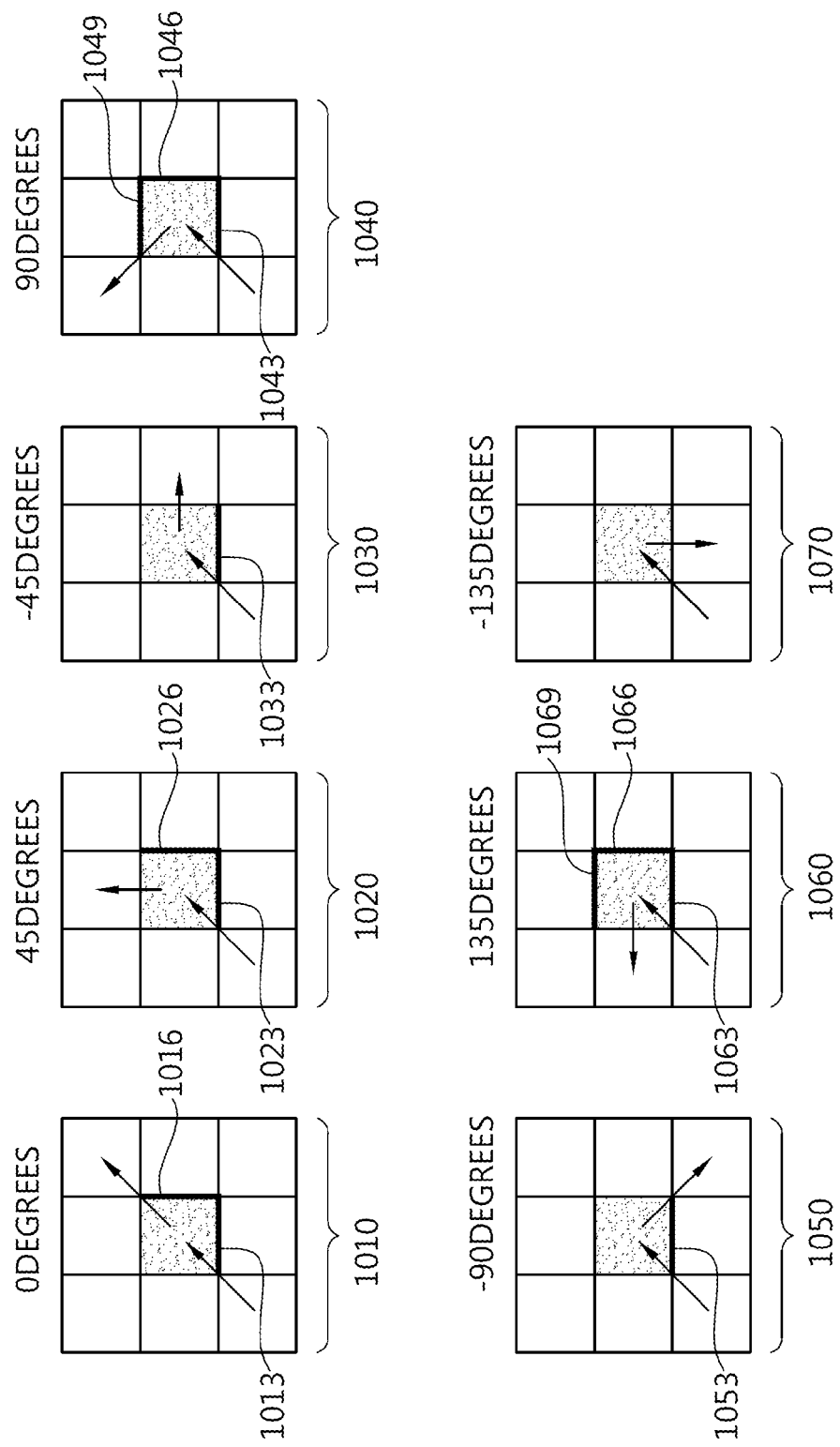
FIG. 10 is a diagram schematically illustrating another example of the method of determining a pixel boundary on the basis of the chain code of the boundary pixels.

FIG. 10 is a diagram schematically illustrating another example of the method of determining the pixel boundary on the basis of the chain codes for the boundary pixels.

1010 to 1070 of FIG. 10 represent blocks of a 3×3 size present in a prediction target block, and arrows illustrated in the blocks represent the progress directions of boundary pixel chains. A pixel located at the center of each 3×3 block illustrated in FIG. 10 represents a boundary pixel $p_n$ to which a chain code is currently applied. In the example illustrated in FIG. 10, the boundary pixel $p_n$ to which a chain code is currently applied is referred to as a "current boundary pixel", and the chain code applied to the current boundary pixel $p_n$ is referred to as a "current chain code". In the example illustrated in FIG. 10, the boundary pixel $p_{n-1}$ located just previous to the current boundary pixel in the boundary pixel chain is referred to as a "previous boundary pixel", and a boundary pixel $p_{n+1}$ located just subsequent to the current boundary pixel in the boundary pixel chain is referred to as a "subsequent boundary pixel".

In the example illustrated in FIG. 10, the video decoder may determine a partial boundary adjacent to the current boundary pixel on the basis of the current chain code corresponding to the current boundary pixel. The video decoder may determine the position of the subsequent boundary pixel on the basis of the angle indicated by the chain code. The specific boundary determining process is described above with reference to FIG. 9 and will not be repeated.

1010 to 1070 of FIG. 10 represent an example where the previous boundary pixel $p_{n-1}$ is a pixel located adjacent to the lower end of a pixel adjacent to the left side of the current boundary pixel $p_n$. In this case, the progress direction from the previous boundary pixel $p_{n-1}$ to the current boundary pixel $p_n$ may be a direction of 45 degrees with respect to the right horizontal direction. Hereinafter, the direction of 45 degrees about the right horizontal direction is referred to as a right-upper direction.

Referring to 1010 of FIG. 10, the chain code may indicate an angle of 0 degrees. At this time, the progress direction from the current boundary pixel $p_n$ to the subsequent boundary pixel $p_{n+1}$ may be a direction of 0 degrees about the right-upper direction. Accordingly, the subsequent boundary pixel $p_{n+1}$ may be determined to be a pixel located at the right-upper position of the current boundary pixel $p_n$.

In 1010 of FIG. 10, a boundary located on the left side relative to the progress direction of the boundary pixel chain in the boundary of the current boundary pixel $p_n$ is a lower boundary 1013 and a right boundary 1016 of the current boundary pixel $p_n$. Accordingly, the lower boundary 1013 and the right boundary 1016 of the current boundary pixel $p_n$ may be determined to be the partial boundary corresponding to the current boundary pixel $p_n$.

Referring to 1020 of FIG. 10, the chain code may indicate an angle of 45 degrees. At this time, the progress direction from the current boundary pixel $p_n$ to the subsequent boundary pixel $p_{n+1}$ may be a direction of 45 degrees about the right-upper direction. Accordingly, the subsequent boundary pixel $p_{n+1}$ may be determined to be a pixel located adjacent to the uppermost position of the current boundary pixel $p_n$.

In 1020 of FIG. 10, a boundary located on the left side relative to the progress direction of the boundary pixel chain in the boundary of the current boundary pixel $p_n$ is a lower boundary 1023 and a right boundary 1026 of the current boundary pixel $p_n$. Accordingly, the lower boundary 1023 and the right boundary 1026 of the current boundary pixel $p_n$ may be determined to be the partial boundary corresponding to the current boundary pixel $p_n$.

Referring to 1030 of FIG. 10, the chain code may indicate an angle of −45 degrees. At this time, the progress direction from the current boundary pixel $p_n$ to the subsequent boundary pixel $p_{n+1}$ may be a direction of −45 degrees about the right-upper direction. Accordingly, the subsequent boundary pixel $p_{n+1}$ may be determined to be a pixel located adjacent to the right side of the current boundary pixel $p_n$.

In 1030 of FIG. 10, a boundary located on the left side relative to the progress direction of the boundary pixel chain in the boundary of the current boundary pixel $p_n$ is a lower boundary 1033 of the current boundary pixel $p_n$. Accordingly, the lower boundary 1033 of the current boundary pixel $p_n$ may be determined to be the partial boundary corresponding to the current boundary pixel $p_n$.

Referring to 1040 of FIG. 10, the chain code may indicate an angle of 90 degrees. At this time, the progress direction from the current boundary pixel $p_n$ to the subsequent boundary pixel $p_{n+1}$ may be a direction of 90 degrees about the right-upper direction. Accordingly, the subsequent boundary pixel $p_{n+1}$ may be determined to be a pixel located at the left-upper position of the current boundary pixel $p_n$.

In 1040 of FIG. 10, a boundary located on the left side relative to the progress direction of the boundary pixel chain in the boundary of the current boundary pixel $p_n$ is a lower boundary 1043, a right boundary 1046, and an upper boundary 1049 of the current boundary pixel $p_n$. Accordingly, the lower boundary 1043, the right boundary 1046, and the upper boundary 1049 of the current boundary pixel $p_n$ may be determined to be the partial boundary corresponding to the current boundary pixel $p_n$.

Referring to 1050 of FIG. 10, the chain code may indicate an angle of −90 degrees. At this time, the progress direction from the current boundary pixel $p_n$ to the subsequent boundary pixel $p_{n+1}$ may be a direction of −90 degrees about the right-upper direction. Accordingly, the subsequent boundary pixel $p_{n+1}$ may be determined to be a pixel located at the left-lower position of the current boundary pixel $p_n$.

In 1050 of FIG. 10, a boundary located on the left side relative to the progress direction of the boundary pixel chain in the boundary of the current boundary pixel $p_n$ is a lower boundary 1053 of the current boundary pixel $p_n$. Accordingly, the lower boundary 1053 of the current boundary pixel $p_n$ may be determined to be the partial boundary corresponding to the current boundary pixel $p_n$.

Referring to 1060 of FIG. 10, the chain code may indicate an angle of 135 degrees. At this time, the progress direction from the current boundary pixel $p_n$ to the subsequent boundary pixel $p_{n+1}$ may be a direction of 135 degrees about the right-upper direction. Accordingly, the subsequent boundary pixel $p_{n+1}$ may be determined to be a pixel located adjacent to the left side of the current boundary pixel $p_n$.

In 1060 of FIG. 10, a boundary located on the left side relative to the progress direction of the boundary pixel chain in the boundary of the current boundary pixel $p_n$ is a lower boundary 1063, a right boundary 1066, and an upper boundary 1069 of the current boundary pixel $p_n$. Accordingly, the lower boundary 1063, the right boundary 1066, and the upper boundary 1069 of the current boundary pixel $p_n$ may be determined to be the partial boundary corresponding to the current boundary pixel $p_n$.

Referring to 1070 of FIG. 10, the chain code may indicate an angle of −135 degrees. At this time, the progress direction from the current boundary pixel $p_n$ to the subsequent boundary pixel $p_{n+1}$ may be a direction of −135 degrees about the right-upper direction. Accordingly, the subsequent boundary pixel $p_{n+1}$ may be determined to be a pixel located adjacent to the lower end of the current boundary pixel $p_n$.

In 1070 of FIG. 10, a boundary located on the left side relative to the progress direction of the boundary pixel chain in the boundary of the current boundary pixel $p_n$ may not be present.

Accordingly, in 1070 of FIG. 10, it may be determined that there is no partial boundary corresponding to the current boundary pixel $p_n$.

It is assumed in the above-mentioned examples that the previous boundary pixel $p_{n-1}$ is a pixel located adjacent to the lower end of a pixel adjacent to the left side of the current boundary pixel $p_n$, but the present invention is not limited to these examples. For example, the boundary determining method in the examples may be identically or similarly applied even when the previous boundary pixel $p_{n-1}$ is a pixel located at the left-upper position of the current boundary pixel $p_n$, a pixel located at the right-upper position of the current boundary pixel $p_n$, and/or a pixel located at the right-lower position of the current boundary pixel $p_n$.

Figure 11:
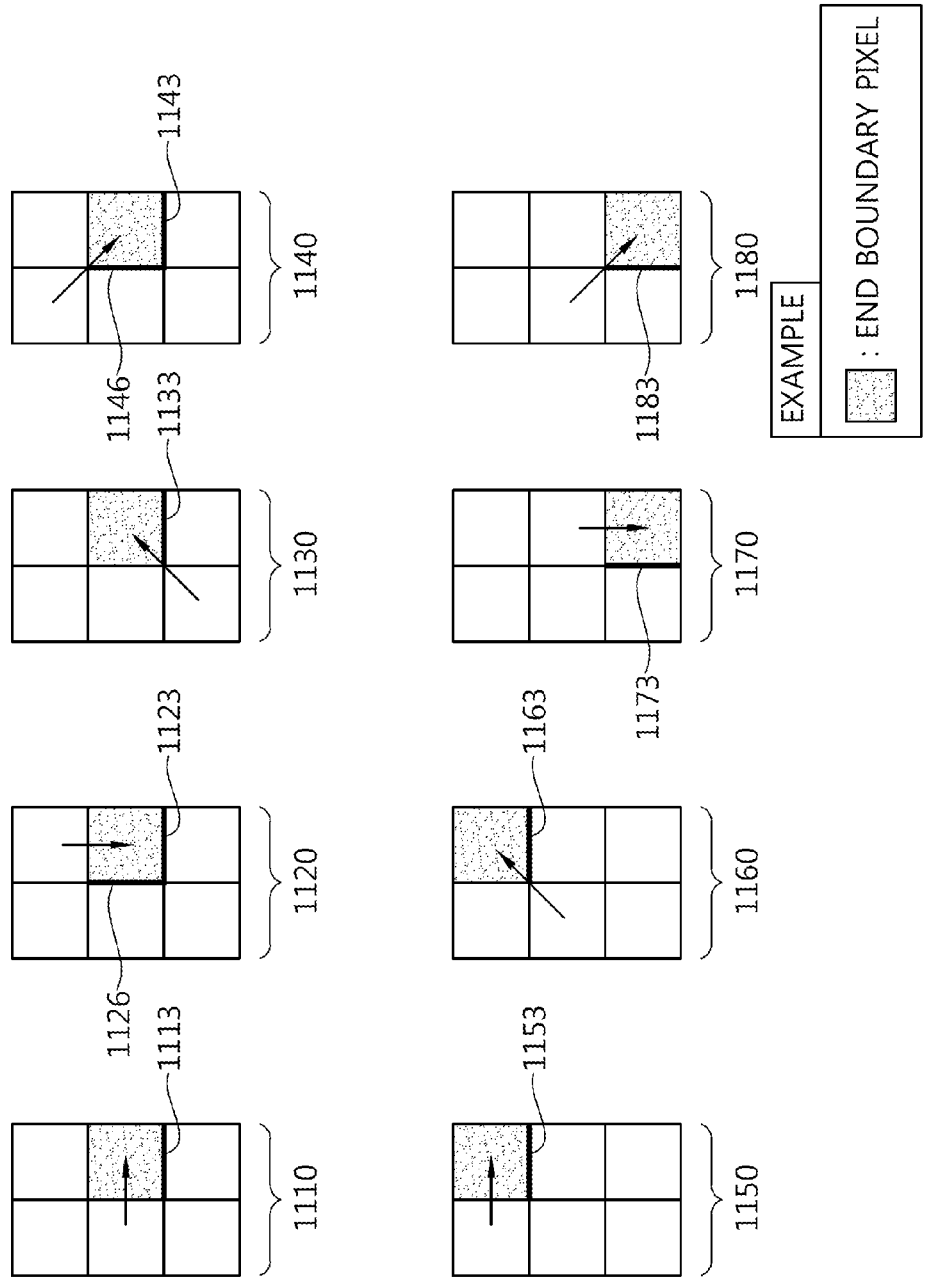
FIG. 11 is a diagram illustrating an example of a method of determining a pixel boundary of an end boundary pixel.

FIG. 11 is a diagram illustrating an example of a method of determining a pixel boundary at an end boundary pixel.

1110 to 1170 of FIG. 11 represent blocks of a 2×3 size adjacent to the right-most side in a prediction target block Arrows marked in 1110 to 1170 of FIG. 11 represent the progress directions of boundary pixel chains. In the example illustrated in FIG. 11, a boundary pixel $p_{n-1}$ located just previous to an end boundary pixel $p_n$ in a boundary pixel chain is referred to as a "previous boundary pixel".

As described in detail with reference to FIG. 7, a chain code corresponding to an end boundary pixel may not be present. At this time, the video decoder may determine a partial boundary adjacent to the end boundary pixel on the basis of the chain code of the previous boundary pixel.

As described above, the chain code may indicate the angle (and/or angle difference) between the progress direction from the previous boundary pixel $p_{n+1}$ to the current boundary pixel $p_n$ and the progress direction from the current boundary pixel $p_n$ to the subsequent boundary pixel $p_{n+1}$. Therefore, in the course of deriving a partial boundary corresponding to the previous boundary pixel in FIG. 11, the progress direction from the previous boundary pixel to the end boundary pixel may be determined. At this time, the partial boundary corresponding to the end boundary pixel may be determined on the basis of the determined progress direction.

For example, as described in detail with reference to FIG. 6, all the boundary pixels forming a boundary pixel chain may be located on the left side relative to the progress direction of the boundary. At this time, the video decoder may determine only a boundary (a boundary of the end boundary pixel) located on the right side relative to the progress direction from the previous boundary pixel to the end boundary pixel as the partial boundary. For example, all the boundary pixels forming a boundary pixel chain may be located on the right side along the progress direction of the boundary. At this time, the video decoder may determine only a boundary (a boundary of the end boundary pixel) located on the left side relative to the progress direction from the previous boundary pixel to the end boundary pixel as the partial boundary. In the example illustrated in FIG. 11, it is assumed that only the boundary located on the right side relative to the progress direction from the previous boundary pixel to the end boundary pixel is determined to be the partial boundary corresponding to the end boundary pixel.

1110 to 1140 of FIG. 11 represent examples where the end boundary pixel is a pixel located at the right center in a 2×3 pixel block. In this case, the end boundary pixel may be a pixel located at the rightmost position in the prediction target block to which the end boundary pixel belongs.

Referring to 1110 of FIG. 11, the progress direction from the previous boundary pixel $p_{n-1}$ to the end boundary pixel $p_n$ may be the right horizontal direction. At this time, the previous boundary pixel may be a pixel located adjacent to the left side of the end boundary pixel. In 1110 of FIG. 11, a boundary located on the left side relative to the progress direction in the boundary of the end boundary pixel is a lower boundary 1113 of the end boundary pixel. Accordingly, the lower boundary 1113 of the end boundary pixel may be determined to be the partial boundary corresponding to the end boundary pixel.

Referring to 1120 of FIG. 11, the progress direction from the previous boundary pixel $p_{n-1}$ to the end boundary pixel $p_n$ may be the lower vertical direction. At this time, the previous boundary pixel may be a pixel located adjacent to the upper end of the end boundary pixel. In 1120 of FIG. 11, a boundary located on the left side relative to the progress direction in the boundary of the end boundary pixel is a lower boundary 1123 and a left boundary 1126 of the end boundary pixel. Accordingly, the lower boundary 1123 and the left boundary 1126 of the end boundary pixel may be determined to be the partial boundary corresponding to the end boundary pixel.

Referring to 1130 of FIG. 11, the progress direction from the previous boundary pixel to the end boundary pixel $p_n$ may be the right-upper direction. At this time, the previous boundary pixel may be a pixel located at the left-lower end of the end boundary pixel. In 1130 of FIG. 11, a boundary located on the left side relative to the progress direction in the boundary of the end boundary pixel is a lower boundary 1133 of the end boundary pixel. Accordingly, the lower boundary 1133 of the end boundary pixel may be determined to be the partial boundary corresponding to the end boundary pixel.

Referring to 1140 of FIG. 11, the progress direction from the previous boundary pixel $p_{n-1}$ to the end boundary pixel $p_n$ may be the right-lower direction. At this time, the previous boundary pixel may be a pixel located on the left-upper side of the end boundary pixel. In 1140 of FIG. 11, a boundary located on the left side relative to the progress direction in the boundary of the end boundary pixel is a lower boundary 1143 and a left boundary 1146 of the end boundary pixel. Accordingly, the lower boundary 1143 and the left boundary 1146 of the end boundary pixel may be determined to be the partial boundary corresponding to the end boundary pixel.

1150 and 1160 of FIG. 11 represent examples where the end boundary pixel is a pixel located on the right-upper side in a 2×3 pixel block. In this case, the end boundary pixel may be a pixel located at the rightmost position in the prediction target block to which the end boundary pixel belongs.

Referring to 1150 of FIG. 11, the progress direction from the previous boundary pixel $p_{n-1}$ to the end boundary pixel $p_n$ may be the right horizontal direction. At this time, the previous boundary pixel may be a pixel located adjacent to the left side of the end boundary pixel. In 1150 of FIG. 11, a boundary located on the left side relative to the progress direction in the boundary of the end boundary pixel is a lower boundary 1153 of the end boundary pixel. Accordingly, the lower boundary 1153 of the end boundary pixel may be determined to be the partial boundary corresponding to the end boundary pixel.

Referring to 1160 of FIG. 11, the progress direction from the previous boundary pixel $p_{n-1}$ to the end boundary pixel $p_n$ may be the right-upper direction. At this time, the previous boundary pixel may be a pixel located on the left-lower side of the end boundary pixel. In 1160 of FIG. 11, a boundary located on the left side relative to the progress direction in the boundary of the end boundary pixel is a lower boundary 1163 of the end boundary pixel. Accordingly, the lower boundary 1163 of the end boundary pixel may be determined to be the partial boundary corresponding to the end boundary pixel.

1170 and 1180 of FIG. 11 represent examples where the end boundary pixel is a pixel located on the right-lower side in a 2×3 pixel block. In this case, the end boundary pixel may be a pixel located at the rightmost position in the prediction target block to which the end boundary pixel belongs.

Referring to 1170 of FIG. 11, the progress direction from the previous boundary pixel $p_{n-1}$ to the end boundary pixel $p_n$ may be the lower vertical direction. At this time, the previous boundary pixel may be a pixel located adjacent to the upper side of the end boundary pixel. In 1170 of FIG. 11, a boundary located on the left side relative to the progress direction in the boundary of the end boundary pixel is a left boundary 1173 of the end boundary pixel. Accordingly, the left boundary 1173 of the end boundary pixel may be determined to be the partial boundary corresponding to the end boundary pixel.

Referring to 1180 of FIG. 11, the progress direction from the previous boundary pixel $p_{n-1}$ to the end boundary pixel $p_n$ may be the right-lower direction. At this time, the previous boundary pixel may be a pixel located adjacent to the left-upper side of the end boundary pixel. In 1180 of FIG. 11, a boundary located on the left side relative to the progress direction in the boundary of the end boundary pixel is a left boundary 1183 of the end boundary pixel. Accordingly, the left boundary 1183 of the end boundary pixel may be determined to be the partial boundary corresponding to the end boundary pixel.

It is assumed in the above-mentioned examples that the end boundary pixel is a pixel located at the leftmost position in the prediction target block, but the present invention is not limited to these examples. For example, the boundary determining method in the examples may be identically or similarly applied even when the end boundary pixel is a pixel located at the leftmost position in the prediction target block, a pixel located at the uppermost position in the prediction target block, and/or a pixel located at the lowermost position in the prediction target block.

When a boundary in the prediction target block is determined as described above, the prediction target block may be split into plural regions on the basis of the determined boundary. That is, the intra prediction module may determine at least two regions in the prediction target block on the basis of the determined boundary. At this time, the intra prediction module may perform a prediction process on each of the plural regions by regions.

For example, when plural neighboring pixels located around the prediction target block are used for the intra prediction, the intra prediction module may perform the prediction process on each of the plural regions on the basis of different neighboring pixels out of the plural neighboring pixels. Here, the plural neighboring pixels may include plural upper neighboring pixels adjacent to the upper side of the prediction target block and plural left neighboring pixels adjacent to the left side of the prediction target block. At this time, when it is assumed that N regions in the prediction target block are defined as $R_0, R_1, \ldots, R_n,$ and $R_{N-1}$ (where N is a positive integer and n is an integer of 0 to N–1), respectively, the predicted values of the pixels in the region may be determined on the basis of the pixels located adjacent to the region $R_n$ out of the plural upper neighboring pixels and the plural left neighboring pixels.

In the below description, each region on which the prediction process is performed in the prediction target block is referred to as a prediction target region.

Figure 12:
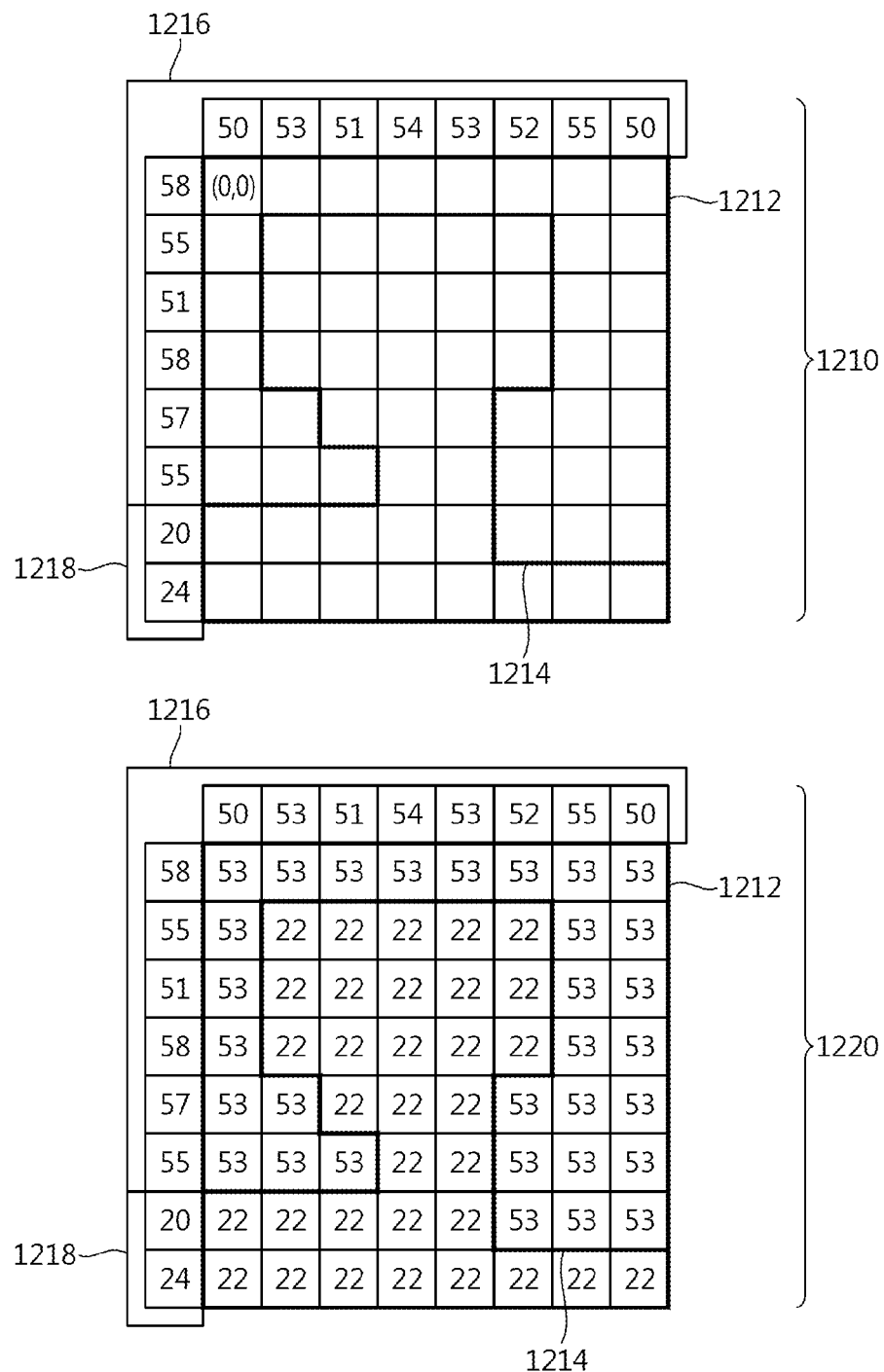
FIG. 12 is a diagram schematically illustrating an example of a method of performing an intra prediction process on regions in a prediction target block.

FIG. 12 is a diagram schematically illustrating an example of a method of performing an intra prediction process on each region in a prediction target block.

1212 of FIG. 12 represents a prediction target block and 1214 of FIG. 12 represents a boundary present in the prediction target block. In FIG. 12, the coordinate of a pixel located at the left-upper corner in the prediction target block 1212 is defined as (0, 0).

Referring to 1210 of FIG. 12, when the pixel boundary 1214 in the prediction target block 1212 is reconstructed, the prediction target block 1212 is split into two prediction target regions on the basis of the boundary 1214. In the example illustrated in FIG. 12, a region including the pixel of (0, 0) out of the two prediction target regions is referred to as a first prediction target region and a region not including the pixel of (0, 0) is referred to as a second prediction target region.

In the example illustrated in FIG. 12, the predicted values of the pixels in each prediction target region may be determined on the basis of plural upper neighboring pixels located adjacent to the upper side of the prediction target block 1212 and plural left neighboring pixels located adjacent to the left side of the prediction target block 1212. At this time, the predicted values of the pixels in each prediction target region may be determined on the basis of the neighboring pixels located adjacent to the corresponding prediction target region.

In 1210 of FIG. 12, the predicted values of the pixels in the first prediction target region may be determined on the basis of neighboring pixels 1216 located adjacent to the first prediction target region out of the plural upper neighboring pixels and the plural left neighboring pixels. At this time, the predicted values of the pixels in the first prediction target region may be determined to be an average value of the pixel values of the neighboring pixels 1216 located adjacent to the first prediction target region.

The predicted values of the pixels in the second prediction target region may be determined on the basis of neighboring pixels 1218 located adjacent to the second prediction target region out of the plural upper neighboring pixels and the plural left neighboring pixels. At this time, the predicted values of the pixels in the second prediction target region may be determined to be an average value of the pixel values of the neighboring pixels 1218 located adjacent to the second prediction target region.

1220 of FIG. 12 represents the predicted pixel values in the first prediction target region and the predicted pixel values in the second prediction target region which are derived in the above-mentioned example.

The average pixel value of the neighboring pixels 1216 used to predict the first prediction target region may be calculated by Expression 1.

$$(50+53+51+54+53+52+55+50+58+55+51+58+57+55)/14=53 \quad \text{Expression 1}$$

The average pixel value of the neighboring pixels 1218 used to predict the second prediction target region may be calculated by Expression 2.

$$(20+24)/2=22 \quad \text{Expression 2}$$

Accordingly, in 1220 of FIG. 12, the predicted values of the pixels in the first prediction target region may be determined to be 53 and the predicted values of the pixels in the second prediction target region may be determined to be 22.

As described above, the intra prediction method of deriving the predicted values of the pixels using the average pixel value of the neighboring pixels corresponding to each prediction target region may be referred to as a region mean method. It has been assumed in the above-mentioned example that a prediction target block is split into two prediction target regions, but the present invention is not limited to these examples. For example, the intra prediction method using the region mean method will be applied identically or similarly even when a prediction target block is split into three or more prediction target regions.

Figure 13:
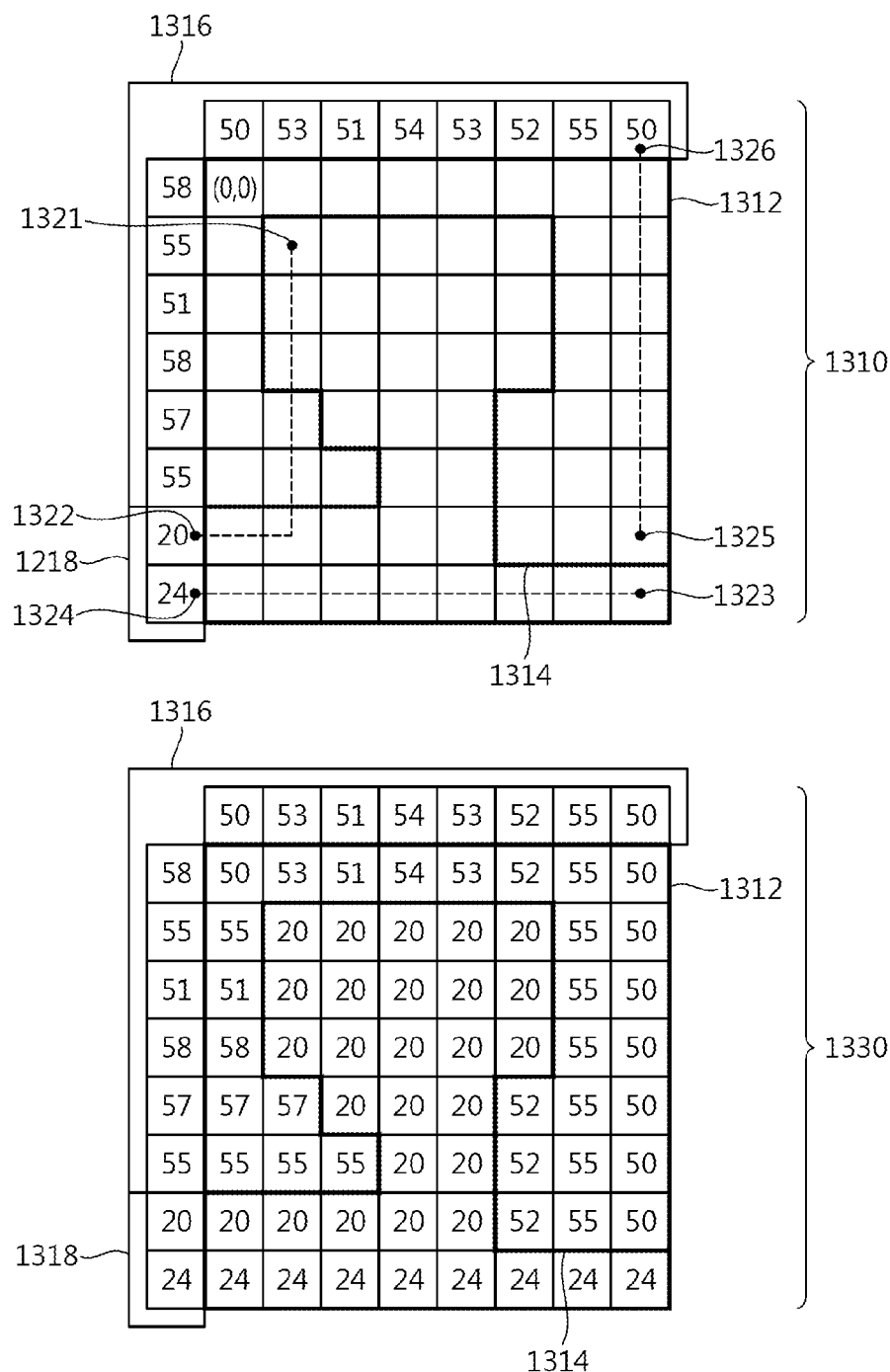
FIG. 13 is a diagram schematically illustrating another example of the method of performing an intra prediction process on regions in a prediction target block.

FIG. 13 is a diagram schematically illustrating another example of the method of performing an intra prediction process on each region in a prediction target block.

1312 of FIG. 13 represents a prediction target block and 1314 of FIG. 13 represents a boundary present in the prediction target block. In FIG. 13, the coordinate of a pixel located at the left-upper corner in the prediction target block 1312 is defined as (0, 0).

Referring to 1310 of FIG. 13, when the pixel boundary 1314 in the prediction target block 1312 is reconstructed, the prediction target block 1312 is split into two prediction target regions on the basis of the boundary 1314. In the example illustrated in FIG. 13, a region including the pixel of (0, 0) out of the two prediction target regions is referred to as a first prediction target region and a region not including the pixel of (0, 0) is referred to as a second prediction target region.

In the example illustrated in FIG. 13, the predicted values of the pixels in each prediction target region may be determined on the basis of plural upper neighboring pixels located adjacent to the upper side of the prediction target block 1312 and plural left neighboring pixels located adjacent to the left side of the prediction target block 1312. At this time, the predicted values of the pixels in each prediction target region may be determined on the basis of the neighboring pixels located adjacent to the corresponding prediction target region.

In 1310 of FIG. 13, the predicted values of the pixels in the first prediction target region may be determined on the basis of neighboring pixels 1316 located adjacent to the first prediction target region out of the plural upper neighboring pixels and the plural left neighboring pixels. At this time, the predicted value of an arbitrary prediction target pixel in the first prediction target region may be determined to be a pixel value of a pixel having the shortest Manhattan distance to the prediction target pixel out of the neighboring pixels 1316. Here, the Manhattan distance may be a value derived by adding a horizontal distance (a difference value between x coordinate values) and a vertical distance (a difference value between y coordinate values).

For example, a neighboring pixel having the shortest Manhattan distance to a pixel 1325 in the first prediction target region out of the neighboring pixels 1316 adjacent to the first prediction target region may be a neighboring pixel 1326. In this case, since the pixel value of the neighboring pixel 1326 is 50, the predicted value of the pixel 1325 in the first prediction target region may be determined to be 50.

In 1310 of FIG. 13, the predicted values of the pixels in the second prediction target region may be determined on the basis of neighboring pixels 1318 located adjacent to the second prediction target region out of the plural upper neighboring pixels and the plural left neighboring pixels. At this time, the predicted value of an arbitrary prediction target pixel in the second prediction target region may be determined to be a pixel value of a pixel having the shortest Manhattan distance to the prediction target pixel out of the neighboring pixels 1318.

For example, a neighboring pixel having the shortest Manhattan distance to a pixel 1321 in the second prediction target region out of the neighboring pixels 1318 adjacent to the second prediction target region may be a neighboring pixel 1322. In this case, since the pixel value of the neighboring pixel 1322 is 20, the predicted value of the pixel 1321 in the second prediction target region may be determined to be 20. On the other hand, a neighboring pixel having the shortest Manhattan distance to a pixel 1323 in the second prediction target region out of the neighboring pixels 1318 adjacent to the second prediction target region may be a neighboring pixel 1324. In this case, since the pixel value of the neighboring pixel 1324 is 24, the predicted value of the pixel 1323 in the second prediction target region may be determined to be 24.

1330 of FIG. 13 represents the predicted pixel values in the first prediction target region and the predicted pixel values in the second prediction target region, which are derived in the above-mentioned examples.

The predicted values in the prediction target block illustrated in FIG. 13 are derived on the basis of the Manhattan distance. In the course of deriving the Manhattan distance, two or more neighboring pixels having the same Manhattan distance to one prediction target pixel may be present. For example, one upper neighboring pixel adjacent to the upper side of the prediction target block and one left neighboring pixel adjacent to the left side of the prediction target block may have the same Manhattan distance to one prediction target pixel. In this case, the intra prediction module may determine only the pixel value of the upper neighboring pixel to be the predicted value of the prediction target pixel, or may determine only the pixel value of the left neighboring pixel to be the predicted value of the prediction target pixel. 1330 of FIG. 13 illustrates an example where the pixel value of the upper neighboring pixel out of the upper neighboring pixel and the left neighboring pixel having the same Manhattan distance (Manhattan distance to the prediction target pixel) is used as the predicted value of the prediction target pixel.

As described above, the intra prediction method of deriving the predicted value of a prediction target pixel on the basis of the Manhattan distance between the prediction target pixel and the neighboring pixels may be referred to as a nearest neighbor method. It has been assumed in the above-mentioned example that a prediction target block is split into two prediction target regions, but the present invention is not limited to these examples. For example, the intra prediction method using the nearest neighbor method will be applied identically or similarly even when a prediction target block is split into three or more prediction target regions.

FIG. 14 is a diagram schematically illustrating another example of the method of performing an intra prediction process on each region in a prediction target block.

1412 of FIG. 14 represents a prediction target block and 1414 of FIG. 14 represents a boundary present in the prediction target block. In FIG. 14, the coordinate of a pixel located at the left-upper corner in the prediction target block 1412 is defined as (0, 0).

Referring to 1410 of FIG. 14, when the pixel boundary 1414 in the prediction target block 1412 is reconstructed, the prediction target block 1412 may be split into two prediction target regions on the basis of the boundary 1414. In the example illustrated in FIG. 14, a region including the pixel of (0, 0) out of the two prediction target regions is referred to as a first prediction target region and a region not including the pixel of (0, 0) is referred to as a second prediction target region. In FIG. 14, numerals marked in the pixels of each prediction target region represent the order in which the pixel values in the corresponding prediction target region are predicted.

In the example illustrated in FIG. 14, the predicted values of the pixels in each prediction target region may be determined on the basis of plural upper neighboring pixels located adjacent to the upper side of the prediction target block 1412 and plural left neighboring pixels located adjacent to the left side of the prediction target block 1412. At this time, the predicted values of the pixels in each prediction target region may be determined on the basis of the neighboring pixels located adjacent to the corresponding prediction target region.

In 1410 of FIG. 14, the predicted values of the pixels in the first prediction target region may be determined on the basis of neighboring pixels 1416 located adjacent to the first prediction target region out of the plural upper neighboring pixels and the plural left neighboring pixels.

Here, when the prediction target pixel in the first prediction target region is a pixel located adjacent to at least one of the neighboring pixels 1416, the predicted value of the prediction target pixel may be determined to be the pixel value of the neighboring pixel adjacent to the prediction target pixel. On the other hand, the prediction target pixel may be located adjacent to two neighboring pixels out of the neighboring pixels 1416. For example, the prediction target pixel may be located adjacent to one upper neighboring pixel and one left neighboring pixel. In this case, the intra prediction module may use only the pixel value of the upper neighboring pixel adjacent to the prediction target pixel as the predicted value of the prediction target pixel, or may use only the pixel value of the left neighboring pixel adjacent to the prediction target pixel as the predicted value of the prediction target pixel.

When the prediction target pixel is a pixel not adjacent to any of the neighboring pixels 1416, the predicted value of the prediction target pixel may be determined to be the pixel value of a previously-predicted in the first prediction target region. Here, the previously-predicted pixel may be a pixel located adjacent to the prediction target pixel.

According to the above-mentioned example, in 1410 of FIG. 14, after an arbitrary pixel in the first prediction target region is predicted, the pixel value of another pixel located adjacent to the arbitrary pixel in the first prediction target region may be predicted. Therefore, the pixel values of the pixels in the first prediction target region in 1410 of FIG. 14 may be sequentially predicted as in the order illustrated in FIG. 14 from pixels adjacent to at least one of the neighboring pixels 1416.

The predicted values of the pixels in the second prediction target region may be determined on the basis of neighboring pixels 1418 located adjacent to the second prediction target region out of the plural upper neighboring pixels and the plural left neighboring pixels.

Here, when the prediction target pixel in the second prediction target region is a pixel located adjacent to at least one of the neighboring pixels 1418, the predicted value of the prediction target pixel may be determined to be the pixel value of the neighboring pixel adjacent to the prediction target pixel. On the other hand, the prediction target pixel may be located adjacent to two neighboring pixels out of the neighboring pixels 1418. For example, the prediction target pixel may be located adjacent to one upper neighboring pixel and one left neighboring pixel. In this case, the intra prediction module may use only the pixel value of the upper neighboring pixel adjacent to the prediction target pixel as the predicted value of the prediction target pixel, or may use only the pixel value of the left neighboring pixel adjacent to the prediction target pixel as the predicted value of the prediction target pixel.

When the prediction target pixel is a pixel not adjacent to any of the neighboring pixels 1418, the predicted value of the prediction target pixel may be determined to be the pixel value of a previously-predicted in the second prediction target region. Here, the previously-predicted pixel may be a pixel located adjacent to the prediction target pixel.

According to the above-mentioned example, in 1410 of FIG. 14, after an arbitrary pixel in the second prediction target region is predicted, the pixel value of another pixel located adjacent to the arbitrary pixel in the second prediction target region may be predicted. Therefore, the pixel values of the pixels in the second prediction target region in 1410 of FIG. 14 may be sequentially predicted as in the order illustrated in FIG. 14 from pixels adjacent to at least one of the neighboring pixels 1418.

1420 of FIG. 14 illustrates the predicted pixel values in the first prediction target region and the predicted pixel values in the second prediction target region which are derived in the above-mentioned example.

As described above, the intra prediction method of deriving the predicted value of a prediction target pixel on the basis of the neighboring pixels located adjacent to the prediction target pixel and/or the previously-predicted pixels located adjacent to the prediction target pixel may be referred to as an adjacent pixel method. It has been assumed in the above-mentioned example that a prediction target block is split into two prediction target regions, but the present invention is not limited to these examples. For example, the intra prediction method using the adjacent pixel method will be applied identically or similarly even when a prediction target block is split into three or more prediction target regions.

On the other hand, as described above with reference to FIG. 5, the video encoder may transmit the intra prediction mode information to the video decoder. The examples of the intra prediction mode information transmitted from the video encoder to the video decoder for each prediction unit are described above with reference to Table 1. When a boundary intra prediction mode is applied as in the examples illustrated in FIGS. 6 to 14, the video encoder needs to additionally transmit the boundary intra prediction mode information to the video decoder.

At this time, the boundary intra prediction mode may be added as a new mode to the existing intra prediction modes. The boundary intra prediction mode may be indicated by an edge index. For example, the edge index may be expressed by EDGE_IDX. For example, when the existing intra prediction modes other than the boundary intra prediction mode have mode values of 0 to 33, the boundary intra prediction mode may be expressed by a mode value of 34. For example, when the existing intra prediction modes other than the boundary intra prediction mode have mode values of 0 to 34, the boundary intra prediction mode may be expressed by a mode value of 35.

According to the examples illustrated in FIGS. 6 to 14, in the boundary intra prediction mode, the video decoder may determine a pixel boundary in a prediction target block on the basis of a chain code and may perform a prediction process on plural regions into which the prediction target block is split on the basis of the boundary by regions. At this time, the video decoder may determine the pixel boundary by sequentially searching for or determining plural boundary pixels forming a boundary pixel chain in the prediction target block on the basis of plural chain codes. Therefore, the video encoder may transmit information on the position of a start boundary pixel located at a point at which the boundary pixel chain starts, the number of chain codes, and the plural chain codes for each prediction unit to the video decoder.

The information on the position of the start boundary pixel may be expressed, for example, by two syntax elements of edge_start_left and edge_start_pos.

Here, edge_start_left may indicate whether the start boundary pixel is located at the leftmost position in the prediction target block or at the uppermost position in the prediction target block. that is, edge_start_left may indicate whether the boundary pixel chain starts from the left boundary of the prediction target block or starts from the upper boundary of the prediction target block. For example, when the boundary pixel chain starts from the left boundary of the prediction target block, edge_start_left may be set to 1. When the boundary pixel chain starts from the upper boundary of the prediction target block, edge_start_left may be set to 0.

edge_start_pos may indicate at what position on the left or upper side in the prediction target block the start boundary pixel is located. For example, it is assumed that the start boundary pixel is located at the leftmost position in the prediction target block. At this time, edge_start_pos may be set to a value indicating at what position in the lower direction from the uppermost position in the prediction target block the start boundary pixel is located. For example, it is assumed that the start boundary pixel is located at the uppermost position in the prediction target block. At this time, edge_start_pos may be set to a value indicating at what position in the right direction from the leftmost position in the prediction target block the start boundary pixel is located.

On the other hand, the information on the number of chain codes may be expressed, for example, by edge_count_minus_1. In the boundary intra prediction mode, since at least one chain code may be transmitted from the video encoder to the video decoder, edge_count_minus_1 may be set to a value obtained by subtracting 1 from the actual number of chain codes. Therefore, the number of chain codes to be transmitted from the video encoder to the video decoder may be a value obtained by adding 1 to edge_count_minus_1. For example, plural chain codes may be specified by edge_code[i]. Here, i may correspond to an index value used to identify the plural chain codes.

In the above-mentioned example, the information on the boundary intra prediction mode to be transmitted from the video encoder to the video decoder for each prediction unit may be defined by a relevant syntax in prediction_unit( ) included in the syntax coding_unit( ). Therefore, the information on the boundary intra prediction mode may be added to the example shown in Table 1 as shown in Table 2.

TABLE 2

```
prediction_unit( ) {
    ...
    prev_intra_luma_pred_flag[ x0 ][ y0 ]
    if( prev_intra_luma_pred_flag[ x0 ][ y0 ] )
        if( NumMPMCand > 1 )
            mpm_idx[ x0 ][ y0 ]
    else
        rem_intra_luma_pred_mode[ x0 ][ y0 ]
    if( intra_luma_pred_mode[x0][y0] == EDGE_IDX ) {
        edge_start_left
        edge_start_pos
        edge_count_minus_1
        for( i = 0; i <= edge_count_minus_1; i++)
            edge_code[i]
    }
    if( IntraPredMode[ x0 ][ y0 ] == 2 )
        planar_flag_luma[ x0 ][ y0 ]
    ...
}
```

Here, intra_luma_pred_mode[x0][y0] may represent the intra prediction mode of a current prediction unit. Referring to Table 2, when the intra prediction mode of a current prediction unit is the boundary intra prediction mode, information on a position of a start boundary pixel, information on the number of chain codes, and information on the chain codes may be transmitted from the video encoder to the video decoder.

As described above with reference to FIG. 5, the number of MPM candidates constituting an MPM list may be a fixed value. When the fixed number is 2 or greater, the number of MPM candidates is always greater than 1 and thus "if (NumMPMCand>1)" in the example shown in Table 2 may be skipped. "if(IntraPredMode[x0] [y0])=2)" and "planar_flag_luma[x0][y0]" in the example shown in Table 2 may be skipped depending on the setting of the intra prediction mode indicated by each mode value.

On the other hand, the information indicating the boundary intra prediction mode may be transmitted on the basis of the MPM or the remaining mode. The remaining mode may be specified, for example, by rem_intra_luma_pred_mode as in the example shown in Table 2.

As described above, the number of possible intra prediction modes of one prediction unit may be a predetermined fixed value. The number of intra prediction modes used as the MPM candidates may also be a predetermined value. Here, a code (and/or a codeword) corresponding to the remaining mode has to express the intra prediction modes corresponding to the number obtained by the number of intra prediction modes used as the MPM candidates from the number of possible intra prediction modes of one prediction unit. Here, the code (and/or the codeword) may correspond to a binary numeral sequence (where the value of each binary numeral is 0 or 1).

When the boundary intra prediction mode is added as a new mode to the existing intra prediction modes, an additional bit for expressing the remaining mode may be necessary. Accordingly, in the remaining mode when the boundary intra prediction mode is added, an escape code in which one bit is added to the code indicating the remaining mode of the existing intra prediction mode may be added to the existing codes. That is, in the remaining mode when the boundary intra prediction mode is used, an escape code in which one bit is added to the code for expressing only the remaining modes of the intra prediction modes other than the boundary intra prediction mode may be additionally used.

For example, it is assumed that the number of possible intra prediction modes of one prediction unit is determined on the basis of the size of the prediction unit. For example, when the boundary intra prediction mode is not used, the number of possible intra prediction modes of a prediction unit with a size of 4×4 may be 17, number of possible intra prediction modes of prediction units with sizes of 8×8, 16×16, and 32×32 may be 34, and number of possible intra prediction modes of a prediction unit with a size of 64×64 may be 3. At this time, when the boundary intra prediction mode is added as a new mode to the existing intra prediction modes, the number of possible intra prediction modes of one prediction unit may be expressed as in Table 3 depending on the size of the prediction unit. In the example shown in Table 3, it is assumed that the number of intra prediction modes used as the MPM candidates is 1.

TABLE 3

| Size of prediction unit | Number of intra prediction modes |
|---|---|
| 4 × 4 | 18 (=17 + 1) |
| 8 × 8, 16 × 16, 32 × 32 | 35 (=34 + 1) |
| 64 × 64 | 4 (=3 + 1) |

In the example shown in Table 3, when a prediction unit has a size of 4×4, the number of possible intra prediction modes of the prediction unit is 18. Here, the code (and/or codeword) corresponding to the remaining mode has to express 17 modes (modes 0 to 16) other than one intra prediction mode used as the MPM candidate.

When only 16 modes (modes 0 to 15) are expressed by the code of the remaining mode, mode 15 may be expressed, for example, by "1111". However, when the boundary intra prediction mode is used, the remaining mode has to express mode 16. Accordingly, mode 15 may be expressed by a code "11110" and mode 16 may be expressed by a code "11111". In this case, when the code of the remaining mode indicates "1111", the video decoder may additional read one bit and may recognize the mode indicated by the code using the additional bit. On the other hand, modes 0 to 14 may be expressed by the same code as the existing code (when the boundary intra prediction mode is not used).

In the example shown in Table 3, when a prediction unit has a size of 4×4, 16×16, or 32×32, the number of possible intra prediction modes of the prediction unit is 35. Here, the code (and/or codeword) corresponding to the remaining mode has to express 34 modes (modes 0 to 33) other than one intra prediction mode used as the MPM candidate.

When only 33 modes (modes 0 to 32) are expressed by the code of the remaining mode, mode 32 may be expressed, for example, by "111111". However, when the boundary intra prediction mode is used, the remaining mode has to express mode 33. Accordingly, mode 32 may be expressed by a code "1111110" and mode 33 may be expressed by a code "1111111". In this case, when the code of the remaining mode indicates "111111", the video decoder may additional read one bit and may recognize the mode indicated by the code using the additional bit. On the other hand, modes 0 to 31 may be expressed by the same code as the existing code (when the boundary intra prediction mode is not used).

In the example shown in Table 3, when a prediction unit has a size of 64×64, the number of possible intra prediction modes of the prediction unit is 4. Here, the code (and/or codeword) corresponding to the remaining mode has to express 3 modes (modes 0 to 2) other than one intra prediction mode used as the MPM candidate.

When only 2 modes (modes 0 and 1) are expressed by the code of the remaining mode, mode 15 may be expressed, for example, by "1". However, when the boundary intra prediction mode is used, the remaining mode has to express mode 2. Accordingly, mode 1 may be expressed by a code "10" and mode 2 may be expressed by a code "11". In this case, when the code of the remaining mode indicates "1", the video decoder may additional read one bit and may recognize the mode indicated by the code using the additional bit. On the other hand, mode 0 may be expressed by the same code as the existing code (when the boundary intra prediction mode is not used).

For example, the number of possible intra prediction modes of one prediction unit may be a predetermined fixed value regardless of the prediction unit. For example, when the boundary intra prediction mode is not used, the number of possible intra prediction modes of the prediction unit may be 35. Here, when the boundary intra prediction modes is added as a new mode to the existing intra prediction modes, the number of possible intra prediction modes of one prediction unit may be 36. Here, it is assumed that the number of intra prediction modes used as the MPM candidates is 3. Then, the code (and/or codeword) corresponding to the remaining mode has to express 33 modes (modes 0 to 32) other than three intra prediction modes used as the MPM candidates.

When only 32 modes (modes 0 to 31) are expressed by the code of the remaining mode, mode 31 may be expressed, for example, by "11111". However, when the boundary intra prediction mode is used, the remaining mode has to express mode 32. Accordingly, mode 31 may be expressed by a code "111110" and mode 32 may be expressed by a code "111111". In this case, when the code of the remaining mode indicates "11111", the video decoder may additional read one bit and may recognize the mode indicated by the code using the additional bit. On the other hand, modes 0 to 30 may be expressed by the same code as the existing code (when the boundary intra prediction mode is not used).

Figure 15:
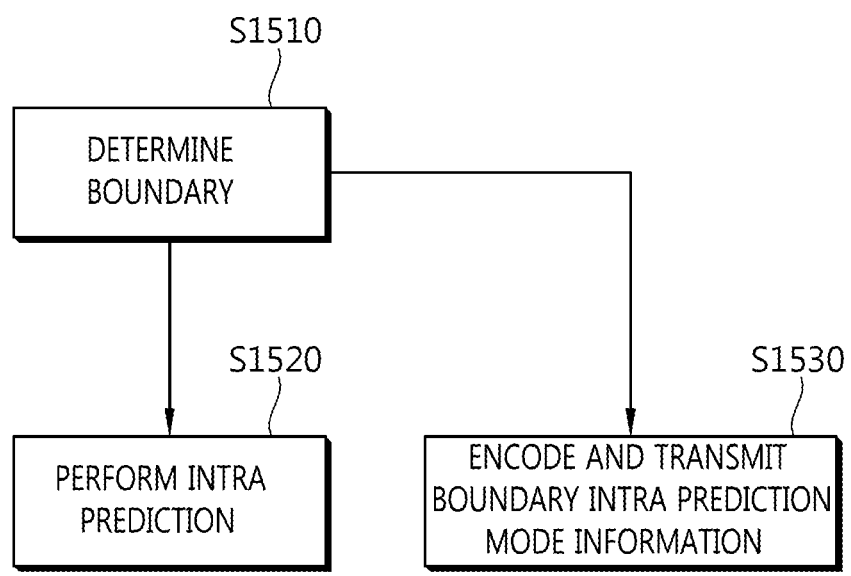
FIG. 15 is a flowchart schematically illustrating an example of a process performed by an encoder when a boundary intra prediction mode is used.

FIG. 15 is a flowchart schematically illustrating an example of a process in a video encoder when a boundary intra prediction mode is used.

Referring to FIG. 15, the video encoder may determine a pixel boundary in a prediction target block (S1510). The boundary may correspond to a boundary of an object present in a picture to which the prediction target block belongs. As described above, the boundary may be specified by at least one boundary pixel located adjacent to the boundary and the boundary pixels may form a boundary pixel chain.

Referring to FIG. 15 again, the video encoder may perform an intra prediction process on the prediction target block on the basis of the determined boundary (S1520).

As described above, when the boundary in the prediction target block is determined, the prediction target block may be split into plural regions on the basis of the determined boundary. Then, the video encoder may perform the prediction process on the plural regions by regions. For example, when plural neighboring pixels located around the prediction target block are used for the intra prediction, the intra prediction module may perform the prediction process on the plural regions on the basis of the different neighboring pixels out of the neighboring pixels. The specific example of the method of performing the prediction process on the plural regions in the prediction target block are the same as described above with reference to FIGS. 12 to 13 and thus will not be repeated herein.

Referring to FIG. 15 again, the video encoder may create boundary intra prediction mode information and may encode and transmit the created information to the decoder (S1530).

When the intra prediction mode corresponding to the prediction target block is the boundary intra prediction mode, the video encoder may transmit information indicating the boundary intra prediction mode to the video decoder on the basis of the MPM and/or the remaining mode. Here, the boundary intra prediction mode may be indicated by an edge index and may be specified, for example, by EDGE_IDX.

When the pixel boundary in the prediction target block is determined, the video encoder may encode and transmit information on the boundary pixels corresponding to the determined boundary to the video decoder. Here, the information on the boundary pixels may include information on a position of a start boundary pixel located at a point from which the boundary pixel chain starts, information on the number of chain codes, and information on the chain codes. The specific example of the method of creating and/or encoding the information on the boundary pixels is the same as described above and thus will not be repeated herein.

Figure 16:
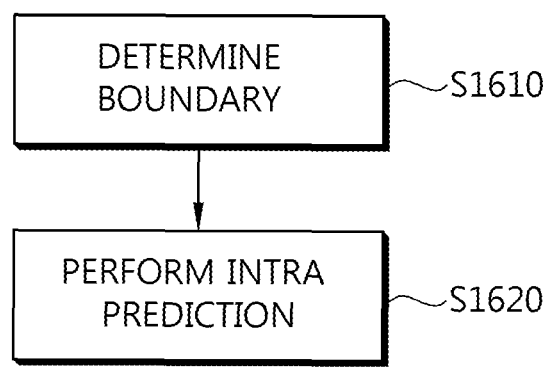
FIG. 16 is a flowchart schematically illustrating an example of an intra prediction method performed by a decoder when a boundary intra prediction mode is used.

FIG. 16 is a flowchart schematically illustrating an example of an intra prediction method in the video decoder when a boundary intra prediction mode is used.

As described above, the video encoder may encode and transmit the boundary intra prediction mode information to the video decoder. When the transmitted intra prediction mode information includes the information indicating the boundary intra prediction mode, the video decoder may perform the boundary determining process and the prediction process according to an example to be described later.

Referring to FIG. 16, the video decoder may determine a pixel boundary in a prediction target block (S1610).

As described above, the boundary intra prediction mode information transmitted from the video encoder may include information on the boundary pixels (for example, information on a position of a start boundary pixel, the number of chain codes, and the chain codes). The video decoder may determine a boundary in the prediction target block by searching for or determining the boundary pixels in the prediction target block on the basis of the information on the boundary pixels. The specific example of the boundary determining process is the same as described above with reference to FIGS. 9 to 11 and thus will not be repeated herein.

Referring to FIG. 16 again, the video decoder may perform an intra prediction on the prediction target block on the basis of the determined boundary (S1620).

When the boundary in the prediction target block is determined as described above, the prediction target block may be split into plural regions on the basis of the determined boundary. Then, the video decoder may perform the prediction process on the plural regions by regions. For example, when plural neighboring pixels located around the prediction target block are used for the intra prediction, the intra prediction module may perform the prediction process on the plural regions on the basis of the different neighboring pixels out of the neighboring pixels. The specific example of the method of performing the prediction process on the plural regions in the prediction target block are the same as described above with reference to FIGS. 12 to 13 and thus will not be repeated herein.

Figure 17:
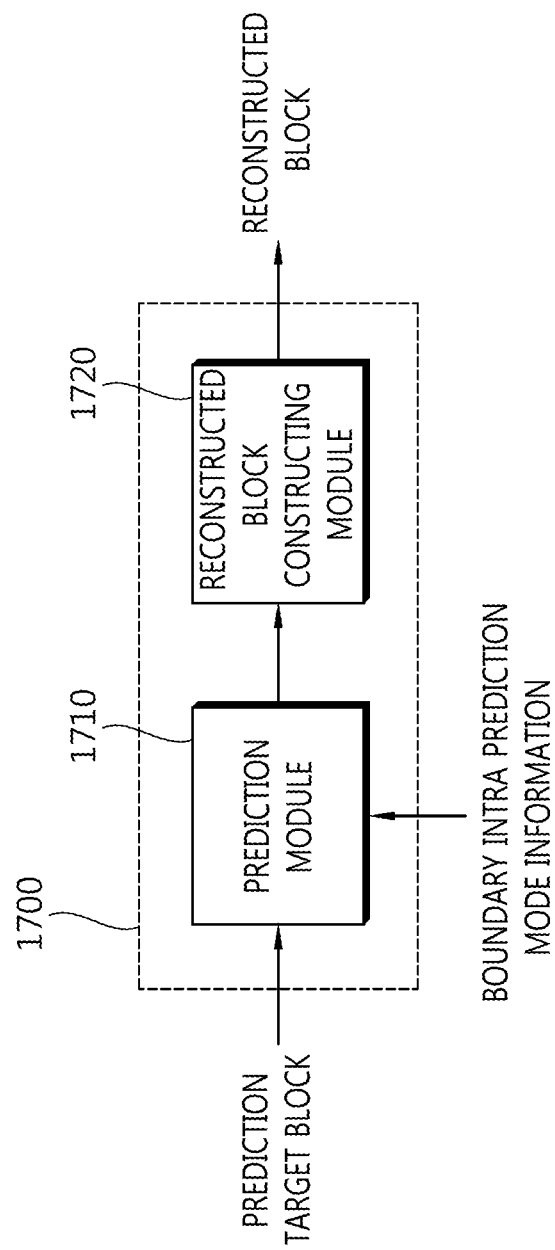
FIG. 17 is a block diagram schematically illustrating an example of a video decoder according to an embodiment of the present invention.

FIG. 17 is a block diagram schematically illustrating an example of a video decoder according to an embodiment of the present invention. The video decoder 1700 illustrated in FIG. 17 includes a prediction module 1710 and a reconstructed block constructing module 1720.

When a prediction mode corresponding to a prediction target block is the boundary intra prediction mode, the prediction module 1710 may determine the pixel boundary in the prediction target block. At this time, the prediction module 1710 may determine the boundary on the basis of boundary intra prediction mode information received from the video encoder. Here, the boundary intra prediction mode information may include information on a position of a start boundary pixel, information on the number of chain codes, and information on the chain codes. The specific example of the boundary determining process is the same as described above and thus will not be repeated herein.

When the boundary in the prediction target block is determined, the prediction target block may be split into plural regions on the basis of the determined boundary. At this time, the prediction module 1710 may construct a predicted block corresponding to the prediction target block by performing a prediction process on the plural regions by regions. Here, the predicted block may be a block including predicted pixels having predicted pixel values. The specific example of the method of performing a prediction process on plural regions in a prediction target block is the same as described above with reference to FIGS. 12 to 14 and thus will not be repeated herein.

The reconstructed block constructing module 1720 may construct a reconstructed block on the basis of the constructed predicted block. At this time, the reconstructed block constructing module 1720 may perform processes such as entropy decoding, dequantization, inverse transform, and filtering to construct the reconstructed block. The specific example of the reconstructed block constructing process is the same as described above with reference to FIG. 3 and thus will not be repeated herein.

Figure 18A:
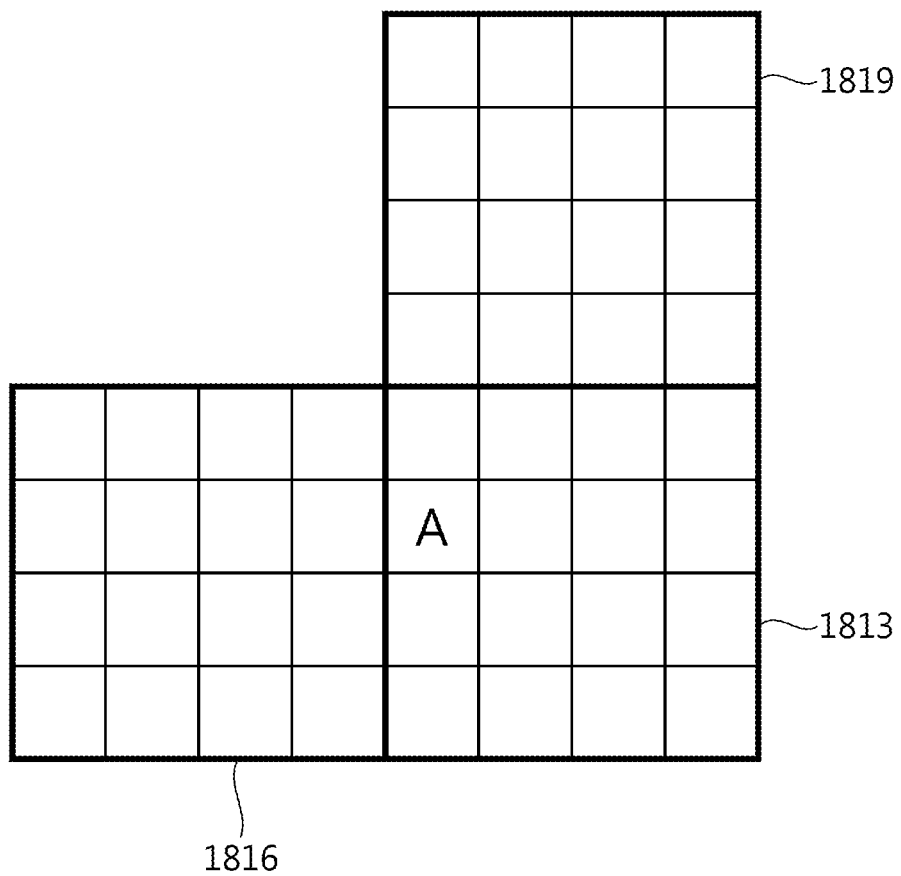
FIGS. 18a to 18c are diagrams schematically illustrating an example of an intra prediction process using a boundary intra prediction mode according to the present invention.
Figure 18B:
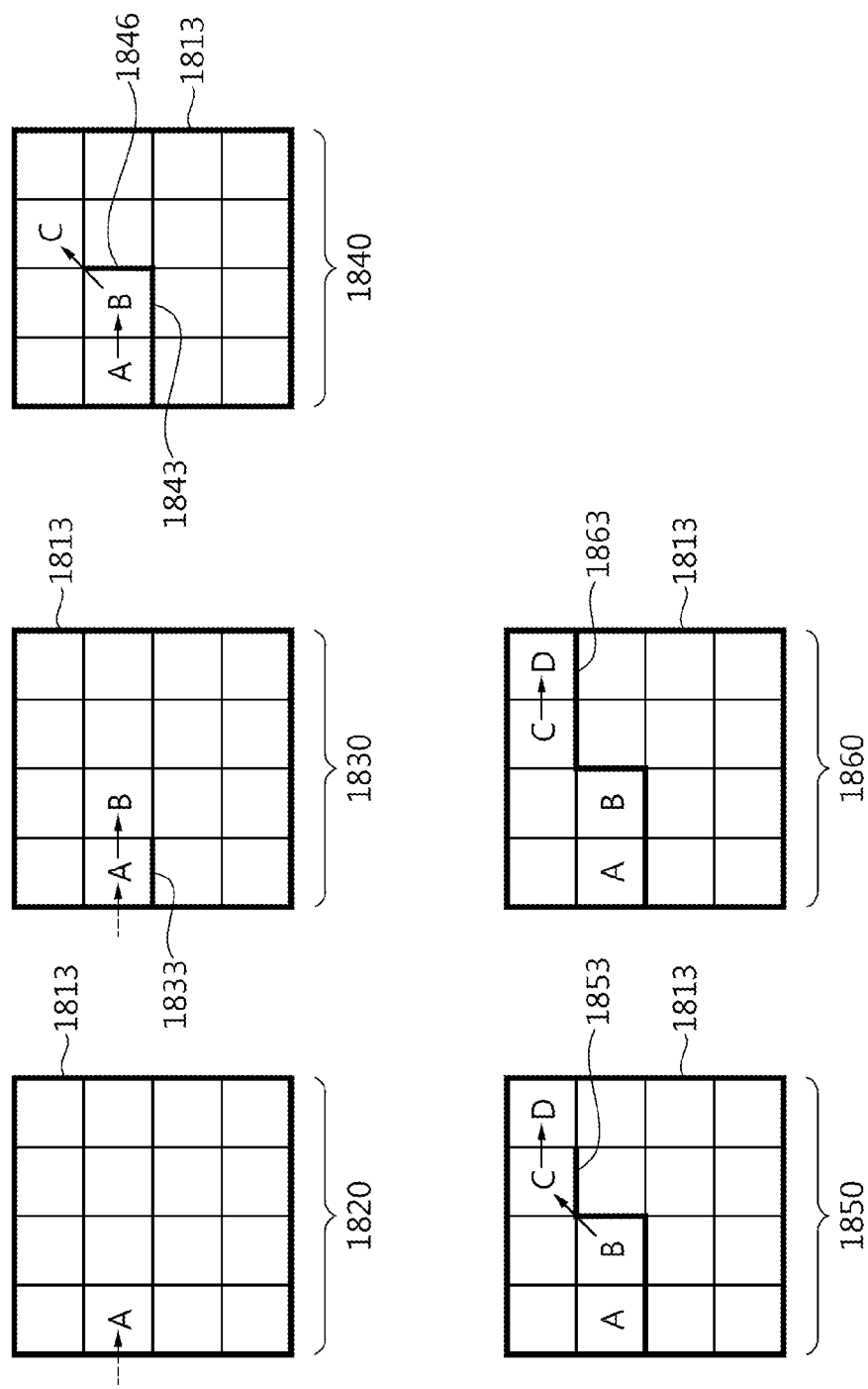
Figure 18C:
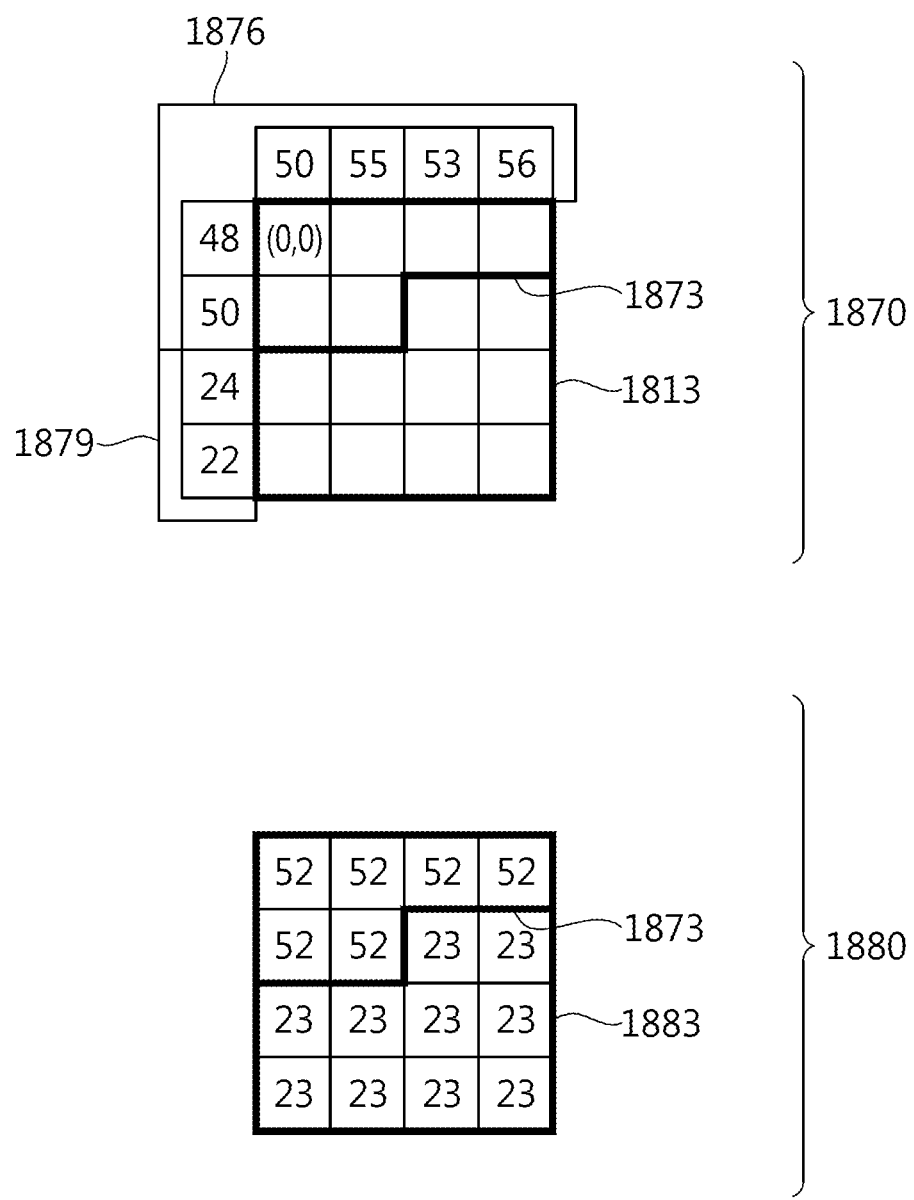

FIGS. 18a to 18c are diagrams schematically illustrating an example of the intra prediction process in the boundary intra prediction mode according to the present invention.

FIG. 18a illustrates a prediction target block 1813 and neighboring blocks 1816 and 1819 used to derive MPM candidates of the prediction target block. In the example illustrated in FIG. 18a, it is assumed that the prediction target block 1813 has a size of 4×4.

As described above with reference to FIG. 5, the intra prediction module may construct an MPM candidate list on the basis of the prediction mode of the left neighboring block 1816 adjacent on the left side of the prediction target block and the prediction mode of the upper neighboring block 1819 adjacent to the upper side of the prediction target block. When the intra prediction mode of the prediction target block 1813 is equal to any one of the MPM candidates, the video encoder may transmit MPM flag information to the video decoder. However, when all the prediction modes of the MPM candidates are different from the prediction mode of the prediction target block, the video encoder may transmit the intra prediction mode of the prediction target block on the basis of the remainmode.

In the example illustrated in FIG. 18a, it is assumed that the intra prediction modes of the left neighboring block 1816 and the upper neighboring block 1819 are the DC mode.

Here, the mode value of the DC mode may be, for example, 2 or 1. At this time, the MPM candidate list constructed on the basis of the prediction modes of the left neighboring block 1816 and the upper neighboring block 1819 may not include the boundary intra prediction mode as the MPM candidate. Accordingly, when the prediction mode of the prediction target block 1813 is the boundary intra prediction mode, the video encoder may transmit the intra prediction mode information of the prediction target block 1813 to the video decoder on the basis of the remaining mode. Here, the remaining mode may be specified by rem_intra_luma_pred_mode as described above.

For example, it is assumed that the number of possible intra prediction modes of a prediction target block with a size of 4×4 is 18 (modes 0 to 17) and the number of intra prediction modes used as the MPM candidates is 1. It is also assumed that the mode value of the boundary intra prediction mode is 17.

At this time, the remaining mode corresponding to the boundary intra prediction mode may correspond to mode 16. In this case, mode 16 of the remaining mode may be expressed, for example, by "11111". Accordingly, the video encoder may transmit the code to the video decoder and the video decoder may know that the intra prediction mode of the prediction target block is the boundary intra prediction mode on the basis of the transmitted code. Here, when the actual intra prediction mode of the prediction target block is IntraPredMode, IntraPredMode may be set to a mode value 17, which may mean that the intra prediction mode of the prediction target block is the boundary intra prediction mode. The boundary intra prediction mode may be indicated by an edge index and may be expressed, for example, by EDGE_IDX.

For example, it is assumed that the number of possible intra prediction modes of a prediction target block with a size of 4×4 is 36 (modes 0 to 35) and the number of intra prediction modes used as the MPM candidates is 3. It is also assumed that the mode value of the boundary intra prediction mode is 35.

At this time, the remaining mode corresponding to the boundary intra prediction mode may correspond to mode 32. In this case, mode 32 of the remaining mode may be expressed, for example, by "111111". Accordingly, the video encoder may transmit the code to the video decoder and the video decoder may know that the intra prediction mode of the prediction target block is the boundary intra prediction mode on the basis of the transmitted code. Here, when the actual intra prediction mode of the prediction target block is IntraPredMode, IntraPredMode may be set to a mode value 34, which may mean that the intra prediction mode of the prediction target block is the boundary intra prediction mode. The boundary intra prediction mode may be indicated by an edge index and may be expressed, for example, by EDGE_IDX.

On the other hand, the video encoder may transmit information on the position of a start boundary pixel located at a point at which the boundary pixel chain starts, the number of chain codes, and the chain codes for the prediction target block corresponding to the boundary intra prediction mode to the video decoder as described above.

As described above, the information on the position of the start boundary pixel may be expressed, for example, by edge_start_left and edge_start_pos. Here, for example, edge_start_left may be set to 1. At this time, edge_start_left may indicate that the start boundary pixel is located at the leftmost position in the prediction target block 1813. For example, edge_start_pos may also be set to 1. At this time, edge_start_pos may indicate that the start boundary pixel corresponds to the second pixel A in the lower direction from the uppermost position in the prediction target block 1813.

On the other hand, the information on the number of chain codes may be expressed, for example, by edge_count_minus_1. In this case, edge_count_minus_1 may be set to a value obtained by subtracting 1 from the number of actual chain codes. For example, when the number of chain codes is 3, edge_count_minus_1 may be set to 2. At this time, 2 may be expressed by a codeword "10".

When the number of chain codes is 3, three chain codes may be expressed by edge_code[0], edge_code[1], and edge_code[2] in the order in which the chain codes are applied to the prediction target block. For example, edge_code[0] may be set to "0", which indicates an angle of 0 degrees. edge_code[1] may be set to "10", which indicates an angel of 45 degrees. edge_code[2] may be set to "110", which indicates an angle of −45 degrees.

In the examples illustrated in FIGS. 18*a* and 18*b*, it is assumed that three chain codes are transmitted. In the examples illustrated in FIGS. 18*a* and 18*b*, the three chain codes are referred to as a first chain code, a second chain code, and a third chain code in the order in which the chain codes are applied to the prediction target lock.

FIG. 18*b* is a diagram illustrating an example of the method of determining a pixel boundary in the prediction target block 1813 on the basis of the chain codes. Arrows marked in 1820 to 1850 of FIG. 18*b* represent progress directions of the boundary pixel chain. In the example illustrated in FIG. 18*b*, it is assumed that the chain code according to the example illustrated in FIGS. 7 and 8 and the boundary determining process according to the example illustrated in FIGS. 9 to 11 are used.

Referring to 1820 of FIG. 18*b*, the intra prediction module may determine the position of the start boundary pixel. As described above with reference to FIG. 18*a*, when edge_start_left is set to 1 and edge_start_pos is set to 1, the start boundary pixel A may be a pixel located at the leftmost position in the prediction target block 1813 and may correspond to the second pixel in the lower direction from the uppermost position therein.

Referring to 1830 of FIG. 18*b*, the first chain code may be applied to the start boundary pixel A. At this time, since a boundary pixel located just previous to the start boundary pixel A is not present, the progress direction from the previous boundary pixel to the start boundary pixel A may be considered as or set to the right horizontal direction as described above in the example illustrated in FIG. 8. Since the first chain code indicates an angle of 0 degrees, the lower boundary 1833 of the start boundary pixel A may be determined to be a partial boundary corresponding to the start boundary pixel A. A boundary pixel located just subsequent to the start boundary pixel A in the progress direction of the boundary pixel chain may be determined to be a boundary pixel B located adjacent to the right side of the start boundary pixel A.

Referring to 1840 of FIG. 18*b*, the second chain code may be applied to the boundary pixel B. Since the second chain code indicates an angle of 45 degrees, the lower boundary 1843 and the right boundary 1846 of the boundary pixel B may be determined to be a partial boundary corresponding to the boundary pixel B. A boundary pixel located just subsequent to the boundary pixel B in the progress direction of the boundary pixel chain may be determined to be a boundary pixel C located at the right-upper position of the boundary pixel B.

Referring to 1850 of FIG. 18*b*, the third chain code may be applied to the boundary pixel C. Since the third chain code indicates an angle of 45 degrees, the lower boundary 1853 of the boundary pixel C may be determined to be a partial boundary corresponding to the boundary pixel C. A boundary pixel located just subsequent to the boundary pixel C in the progress direction of the boundary pixel chain may be determined to be a boundary pixel D located adjacent to the right side of the boundary pixel C. Here, the boundary pixel D may correspond to an end boundary pixel.

Referring to 1860 of FIG. 18*b*, the intra prediction module may determine a partial boundary corresponding to the end boundary pixel D. As described above with reference to FIG. 11, the partial boundary corresponding to the end boundary pixel D may be determined on the basis of the progress direction from the boundary pixel C (the pixel located just previous to the end boundary pixel D in the boundary pixel chain) to the end boundary pixel D. In 1860 of FIG. 18*b*, since the progress direction from the boundary pixel C to the end boundary pixel D is the right horizontal direction, the lower boundary of the end boundary pixel D may be determined to be the partial boundary corresponding to the end boundary pixel D.

In the example illustrated in FIG. 18*b*, the intra prediction module may determine the whole boundary in the prediction target block 1813 by sequentially determining plural boundary pixels and partial boundaries corresponding to the plural boundary pixels along the progress direction of the boundary from the start boundary pixel.

FIG. 18*c* is a diagram schematically illustrating an example of the method of performing an intra prediction process on regions in the prediction target block. In the example illustrated in FIG. 18*c*, it is assumed that the intra prediction process is performed on the basis of the region mean method.

1870 of FIG. 18*c* represents a prediction target block 1813 and a boundary 1873 determined for the prediction target block. In FIG. 18*c*, it is assumed that the coordinates of a pixel located at the left-upper corner in the prediction target block 1813 is (0, 0).

Referring to 1870 of FIG. 18*c*, when the pixel boundary 1873 in the prediction target block 1813 is reconstructed, the prediction target block 1813 may be split to two prediction target regions based on the boundary 1873. In the example illustrated in FIG. 18*c*, a region including the pixel of (0, 0) out of the two prediction target regions is defined as a first prediction target region and the region not including the pixel of (0, 0) is defined as a second prediction target region.

In the example illustrated in FIG. 18*c*, the predicted values of the pixels in the prediction target regions may be determined on the basis of plural upper neighboring pixels adjacent to the upper side of the prediction target block 1813 and plural left neighboring pixels adjacent to the left side of the prediction target block 1813.

In 1870 of FIG. 18*c*, the predicted values of the pixels in the first prediction target region may be determined on the basis of the neighboring pixels 1876 adjacent to the first prediction target region out of the plural upper neighboring pixels and the plural left neighboring pixels. At this time, the prediction module may determine the average value of the pixel values of the neighboring pixels 1876 adjacent to the first prediction target region as the predicted values of the pixels in the first prediction target region.

The predicted values of the pixels in the second prediction target region may be determined on the basis of the neighboring pixels 1879 adjacent to the second prediction target region out of the plural upper neighboring pixels and the plural left neighboring pixels. At this time, the prediction module may determine the average value of the pixel values of the neighboring pixels 1879 adjacent to the second prediction target region as the predicted values of the pixels in the second prediction target region.

1880 of FIG. 18*c* represents the predicted pixel values in the first prediction target region and the second prediction target region which are derived in the above-mentioned example. In 1880 of FIG. 18*c*, a block 1883 represents a predicted block constructed by performing the prediction process on the prediction target block 1813.

The average pixel value of the neighboring pixels 1876 used to predict the first prediction target region may be calculated by Expression 3.

$$(50+55+53+56+48+50)/6=52 \quad \text{Expression 3}$$

The average pixel value of the neighboring pixels 1879 used to predict the second prediction target region may be calculated by Expression 4.

$$(24+22)/2=23 \quad \text{Expression 4}$$

Accordingly, in 1880 of FIG. 18*c*, the predicted values of the pixels in the first prediction target region may be determined to be 52 and the predicted values of the pixels in the second prediction target region may be determined to be 23.

While the methods in the above-mentioned examples have been described by a series of steps or blocks on the basis of flowcharts, the invention is not limited to the order of steps, and a certain step may be performed in an order other than described above or at the same time as described above. It will be understood by those skilled in the art that the steps included in the flowcharts are not exclusive and another step is added or one or more steps in the flowcharts is deleted without affecting the scope of the invention.

The above-mentioned embodiments include various examples. All possible combinations for implementing such various examples cannot be described herein but it will be understood by those skilled in the art that other combinations can be possible. Therefore, the invention includes all substitutions, corrections, and modifications belonging to the appended claims.

The invention claimed is:

1. An intra prediction method of predicting pixel values in a prediction target block on the basis of a plurality of neighboring pixels adjacent to the prediction target block, comprising the steps of:

receiving and decoding encoded video information;

determining a target boundary by determining a plurality of boundary pixels indicating a target boundary in the prediction target block on the basis of the decoded video information;

determining a plurality of prediction target regions into which the prediction target block is split by the target boundary; and performing a prediction on the plurality of prediction target regions on the basis of different neighboring pixels out of the plurality of neighboring pixels, wherein the plurality of boundary pixels include N boundary pixels $\{p_0, p_1, \ldots, p_n, \ldots, p_{N-1}\}$, N is a positive integer, and n is an integer of 0 to N−1, wherein the video information includes information indicating a chain code corresponding to the boundary pixel $p_n$, wherein the chain code indicates an angle between a first progress direction from the boundary pixel pn−1 to the boundary pixel $p_n$ and a second progress direction from the boundary pixel $p_n$ to the boundary pixel $p_{n+1}$, wherein the chain code is selected from a chain code group comprising 7 chain codes including a first chain code representing 0 degree, a second chain code representing 45 degree, a third chain code representing −45 degree, a fourth chain code representing 90 degree, a fifth chain code representing −90 degree, a sixth chain code representing 135 degree and a seventh chain code representing −135 degree, and wherein the first chain code is represented by a binary code "0", the second chain code is represented by a binary code "10", the third chain code is represented by a binary code "110", the fourth chain code is represented by a binary code "1110", the fifth chain code is represented by a binary code "11110", the sixth chain code is represented by a binary code "111110" and the seventh chain code is represented by a binary code "111111".

2. The intra prediction method according to claim 1, wherein the prediction target block is one block out of a plurality of blocks constituting a depth image of a 3D video.

3. The intra prediction method according to claim 1, wherein the boundary pixel $p_n$ is sequentially determined along a progress direction indicated on the basis of the boundary pixel $p_{n-1}$.

4. The intra prediction method according to claim 3, wherein the received video information includes position information indicating a position of a start boundary pixel $p_0$ which is first determined out of the plurality of boundary pixels, and wherein the step of determining the target boundary includes determining the start boundary pixel $p_0$ on the basis of the position information.

5. The intra prediction method according to claim 4, wherein the start boundary pixel p0 is a pixel located at the leftmost position or the uppermost position in the prediction target block.

6. The intra prediction method according to claim 5, wherein the step of determining the target boundary includes determining a partial boundary corresponding to a part adjacent to the boundary pixel $p_n$ in the target boundary on the basis of the first progress direction and the second progress direction.

7. The intra prediction method according to claim 6, wherein the step of determining the target boundary includes determining the position of the boundary pixel $p_{n+1}$ on the basis of the first progress direction and the second progress direction.

8. The intra prediction method according to claim 2, wherein the boundary pixel $p_n$ corresponds to the start boundary pixel $p_1$, wherein the first progress direction is set to a right horizontal direction when the boundary pixel $p_n$ is a pixel located at the leftmost position in the prediction target block, and wherein the first progress direction is set to a lower vertical direction when the boundary pixel $p_n$ is a pixel located at the uppermost position in the prediction target block.

9. The intra prediction method according to claim 3, wherein the boundary pixel $p_{N-1}$ is an end boundary pixel which is finally determined out of the plurality of boundary pixels, and wherein the step of determining the target boundary includes determining a partial boundary corresponding to a part adjacent to the end boundary pixel $p_{N-1}$ in the target boundary on the basis of the progress direction from the boundary pixel $p_{N-2}$ to the end boundary pixel $p_{N-1}$.

10. The intra prediction method according to claim 1, wherein the plurality of prediction target regions include M prediction target regions $R_0, R_1, \ldots, R_m, \ldots,$ and $R_{M-1}$ is a positive integer, and m is an integer of 0 to M−1, and wherein the step of performing the prediction process includes performing a prediction process on the prediction target region Rm on the basis of the neighboring pixels adjacent to the prediction target region Rm out of the plurality of neighboring pixels.

11. The intra prediction method according to claim 10, wherein the step of performing the prediction process includes determining an average pixel value of the neighboring pixels adjacent to the prediction target region $R_m$ as predicted values of the pixels belonging to the prediction target region $R_m$.

12. A video decoder comprising:

an entropy-decoding module that obtains video information from a received bitstream;

a prediction module that constructs a predicted block corresponding to a prediction target block by predicting pixel values in the prediction target block on the basis of a plurality of neighboring pixels adjacent to the prediction target block; and a reconstructed block constructing module that constructs a reconstructed block on the basis of the predicted block, wherein the prediction module determines a target boundary by determining a plurality of boundary pixels indicating the target boundary in the prediction target block on the basis of the decoded video information, and performs a prediction on a plurality of prediction target regions, into which the prediction target block is split by the target boundary, on the basis of different neighboring pixels out of the plurality of neighboring pixels, wherein the plurality of boundary pixels include N boundary pixels $\{p_0, p_1, \ldots, p_n, \ldots, p_{N-1}\}$, N is a positive integer, and n is an integer of 0 to N−1, wherein the video information includes information indicating a chain code corresponding to the boundary pixel $p_n$, wherein the chain code indicates an angle between a first progress direction from the boundary pixel $p_{n-1}$ to the boundary pixel $p_n$ and a second progress direction from the boundary pixel $p_n$ to the boundary pixel $p_{n+1}$, wherein the chain code is selected from a chain code group comprising 7 chain codes including a first chain code representing 0 degree, a second chain code representing 45 degree, a third chain code representing −45 degree, a fourth chain code representing 90 degree, a fifth chain code representing −90 degree, a sixth chain code representing 135 degree and a seventh chain code representing −135 degree, and wherein the first chain code is represented by a binary code "0", the second chain code is represented by a binary code "10", the third chain code is represented by a binary code "110", the fourth chain code is represented by a binary code "1110", the fifth chain code is represented by a binary code "11110", the sixth chain code is represented by a binary code "111110" and the seventh chain code is represented by a binary code "111111".

13. A video decoding method comprising the steps of:
receiving and decoding encoded video information;
determining a target boundary by determining a plurality of boundary pixels indicating the target boundary in the prediction target block on the basis of the decoded video information;
determining a plurality of prediction target regions into which the prediction target block is split by the target boundary;
constructing a predicted block corresponding to the prediction target block by performing a prediction on the plurality of prediction target regions on the basis of different neighboring pixels out of the plurality of neighboring pixels adjacent to the prediction target block; and
constructing a reconstructed block on the basis of the predicted block,
wherein the plurality of boundary pixels include N boundary pixels $\{p_0, p_1, \ldots, p_n, \ldots, p_{N-1}\}$, N is a positive integer, and n is an integer of 0 to N−1,
wherein the video information includes information indicating a chain code corresponding to the boundary pixel $p_n$,
wherein the chain code indicates an angle between a first progress direction from the boundary pixel $p_{n-1}$ to the boundary pixel $p_n$ and a second progress direction from the boundary pixel $p_n$ to the boundary pixel $p_{n+1}$,
wherein the chain code is selected from a chain code group comprising 7 chain codes including a first chain code representing 0 degree, a second chain code representing 45 degree, a third chain code representing −45 degree, a fourth chain code representing 90 degree, a fifth chain code representing −90 degree, a sixth chain code representing 135 degree and a seventh chain code representing −135 degree, and
wherein the first chain code is represented by a binary code "0", the second chain code is represented by a binary code "10", the third chain code is represented by a binary code "110", the fourth chain code is represented by a binary code "1110", the fifth chain code is represented by a binary code "11110", the sixth chain code is represented by a binary code "111110" and the seventh chain code is represented by a binary code "111111".

14. The video decoding method according to claim 13, wherein the prediction target block is one block out of a plurality of blocks constituting a depth image of a 3D video.

15. The video decoding method according to claim 13, wherein the boundary pixel $p_n$ is sequentially determined along a progress direction indicated on the basis of the boundary pixel $p_{n-1}$.

16. The video decoding method according to claim 15, wherein the received video information includes position information indicating a position of a start boundary pixel $p_0$ which is first determined out of the plurality of boundary pixels, and
wherein the step of determining the target boundary includes determining the start boundary pixel $p_0$ on the basis of the position information.

17. The video decoding method according to claim 16, wherein the step of determining the target boundary includes determining a partial boundary corresponding to a part adjacent to the boundary pixel $p_n$ in the target boundary on the basis of the first progress direction and the second progress direction.

18. The video decoding method according to claim 13, wherein the plurality of prediction target regions include M prediction target regions $R_0, R_1, \ldots, R_m, \ldots,$ and $R_{M-1}$, M is a positive integer, and m is an integer of 0 to M−1, and
wherein the step of constructing the predicted block includes performing a prediction process on the prediction target region $R_m$ on the basis of the neighboring pixels adjacent to the prediction target region $R_m$ out of the plurality of neighboring pixels.

19. The video decoding method according to claim 18, wherein the step of constructing the predicted block includes determining an average pixel value of the neighboring pixels adjacent to the prediction target region $R_m$ as predicted values of the pixels belonging to the prediction target region $R_m$.

* * * * *